US011252390B2

(12) United States Patent
Alshina et al.

(10) Patent No.: US 11,252,390 B2
(45) Date of Patent: Feb. 15, 2022

(54) METHOD AND APPARATUS FOR ENCODING OR DECODING 360 DEGREE IMAGE

(71) Applicant: SAMSUNG ELECTRONICS CO., LTD., Suwon-si (KR)

(72) Inventors: Elena Alshina, Seoul (KR); Vladyslav Zakharchenko, Seoul (KR); Kwang-pyo Choi, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/477,966

(22) PCT Filed: Jan. 10, 2018

(86) PCT No.: PCT/KR2018/000478
§ 371 (c)(1),
(2) Date: Jul. 15, 2019

(87) PCT Pub. No.: WO2018/131888
PCT Pub. Date: Jul. 19, 2018

(65) Prior Publication Data
US 2019/0373240 A1 Dec. 5, 2019

Related U.S. Application Data

(60) Provisional application No. 62/445,820, filed on Jan. 13, 2017.

(51) Int. Cl.
*H04N 13/139* (2018.01)
*H04N 13/178* (2018.01)
*H04N 19/597* (2014.01)

(52) U.S. Cl.
CPC ......... *H04N 13/139* (2018.05); *H04N 13/178* (2018.05); *H04N 19/597* (2014.11)

(58) Field of Classification Search
CPC .... H04N 13/139; H04N 13/178; H04N 13/00; H04N 19/597; H04N 19/119;
(Continued)

(56) References Cited

U.S. PATENT DOCUMENTS 6,118,595 A * 9/2000 Miller ................... G03B 37/04
348/36
7,623,682 B2 11/2009 Park et al.
(Continued)

FOREIGN PATENT DOCUMENTS

KR 10-2006-0050350 A 5/2006
KR 10-2014-0112909 A 9/2014
KR 10-2016-0125708 A 11/2016

OTHER PUBLICATIONS

Search Report and Written Opinion dated Apr. 25, 2018, issued by the International Searching Authority in International Application No. PCT/KR2018/000478 (PCT/ISA/210 and PCT/ISA/237).
(Continued)

*Primary Examiner* — Matthew K Kwan
(74) *Attorney, Agent, or Firm* — Sughrue Mion, PLLC

(57) ABSTRACT

Provided are a method and apparatus for encoding or decoding a 360-degree image. An image decoding method and apparatus according to an embodiment include: obtaining image data from a bitstream; decoding a first region of a projection image corresponding to a non-clipping region of a 360-degree image from the image data; obtaining information about a clipping region of the 360-degree image from the bitstream; determining a second region of the projection image, based on the information about the clipping region; and converting the projection image including the first region and the second region into the 360-degree image.

12 Claims, 22 Drawing Sheets

(58) Field of Classification Search
CPC .... H04N 19/129; H04N 19/176; H04N 19/96; H04N 19/70; H04N 19/184
USPC ........................................ 348/36; 375/240.26
See application file for complete search history.

(56) References Cited

U.S. PATENT DOCUMENTS

| | | | |
|---|---|---|---|
| 2006/0034529 A1* | 2/2006 | Park | H04N 19/563 382/236 |
| 2012/0169842 A1 | 7/2012 | Chuang et al. | |
| 2014/0267593 A1 | 9/2014 | Kim et al. | |
| 2016/0142697 A1 | 5/2016 | Budagavi et al. | |
| 2017/0085917 A1* | 3/2017 | Hannuksela | H04N 19/523 |
| 2017/0214937 A1* | 7/2017 | Lin | H04N 19/563 |
| 2018/0091577 A1 | 3/2018 | Park et al. | |

OTHER PUBLICATIONS

Communication dated Dec. 14, 2021 issued by the Korean Patent Office in counterpart Korean Application No. 10-2019-7019962.
Emmanuel Thomas et al., "Projection-independent ROI signaling for spherical content", ISO/IEC JTC1/SC29/WG11 MPEG2016/M39424, Oct. 12, 2016 (4 pages total).
Byeongdoo Choi et al., "WD in ISO/IEC 23000-20 Omnidirectional Media Application Format", ISO/IEC JTC1/SC29/WG11 N16439, Oct. 2016, (55 pages total).
"Great Circle", Wolfram MathWorld, Apr. 3, 2016, retrieved from https://web.archive.org/web/20160403044058/https://mathworld.wolfram.com/GreatCircle.html, (3 pages total).
Miska M. Hannuksela et al., "SEI messages from omnidirectional video" JCT-VC of ITU-T SG 16 WP 3 and ISO/IEC JTC 1/SC 29/WG 11 26th Meeting, JCTVC-Z0044, Jan. 6, 2017 pp. 1-5 (5 pages total).

* cited by examiner

| video_parameter_set_rbsp( ) { | Descriptor |
|---|---|
| ... | |
| vps_360_extension_flag | u(1) |
| if( vps_360_extension_flag ) | |
| vps_360_extension( ) | |
| ... | |
| } | |

| vps_360_extension ( ) { | Descriptor |
|---|---|
| vps_top_clip_flag | u(1) |
| if(vps_top_clip_flag) | |
| start_top_angle | ue(v) |
| fill_top_region() | |
| vps_bottom_clip_flag | u(1) |
| if(vps_bottom_clip_flag) | |
| start_bottom_angle | ue(v) |
| fill_bottom_region() | |
| } | |

FIG. 20

| BLOCK SHAPE / DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

METHOD AND APPARATUS FOR ENCODING OR DECODING 360 DEGREE IMAGE

TECHNICAL FIELD

The present disclosure relates to a method and apparatus for encoding or decoding an image, and more particularly, to a method and apparatus for encoding or decoding a 360-degree image.

BACKGROUND ART

Image data is encoded by a codec based on a predetermined data compression standard, for example, a Moving Picture Experts Group (MPEG) standard, and then stored in the form of a bitstream in a storage medium or transmitted through a communication channel.

With the development and spread of hardware capable of reproducing and storing high-resolution or high-definition image content, the demand for codecs for effectively encoding or decoding high-resolution or high-definition image content is increasing. Encoded image content can be reproduced by being decoded. Recently, methods for effectively compressing such high-resolution or high-definition image content have been performed. For example, a method for effectively compressing an image to be encoded by processing the image by an arbitrary method has been performed.

Also, with the recent development of virtual reality (VR)-related technology and apparatuses, VR apparatuses using VR-related technology and apparatuses are in the spotlight. Such VR apparatuses are being widely applied to various fields, such as entertainment, education, office work, and medical treatment.

VR images displayed on a VR apparatus move according to eyes of a user wearing a VR display, and therefore, the VR images should include all surrounding images around the user. That is, VR images that are provided by a VR apparatus are images corresponding to all directions around a user, that is, 360-degree images. Accordingly, the interest in processing 360-degree images is increasing in line with interest in VR apparatuses.

DESCRIPTION OF EMBODIMENTS

Technical Problem

Provided are a method and apparatus for encoding or decoding a 360-degree image.

Solution to Problem

An image decoding method according to an embodiment includes: obtaining image data from a bitstream; decoding a first region of a projection image corresponding to a non-clipping region of a 360-degree image from the image data; obtaining information about a clipping region of the 360-degree image from the bitstream; determining a second region of the projection image, based on the information about the clipping region; and converting the projection image including the first region and the second region into the 360-degree image.

An image decoding apparatus according to an embodiment includes: a data obtainer configured to obtain image data and information about a clipping region of a 360-degree image from a bitstream; a decoder configured to decode a first region of a projection image corresponding to a non-clipping region of the 360-degree image from the image data, and to determine a second region of the projection image, based on the information about the clipping region; and a converter configured to convert the projection image including the first region and the second region into the 360-degree image.

An image encoding method according to an embodiment includes: determining a clipping region and a non-clipping region in a 360-degree image; converting the 360-degree image into a projection image; encoding a first region of the projection image corresponding to the non-clipping region of the 360-degree image; and generating a bitstream including image data for the encoded first region of the projection image, and information about the clipping region of the 360-degree image.

An image encoding apparatus according to an embodiment includes: a converter configured to determine a clipping region and a non-clipping region in a 360-degree image and to convert the 360-degree image into a projection image; an encoder configured to encode a first region of the projection image corresponding to the non-clipping region of the 360-degree image; and a bitstream generator configured to generate a bitstream including image data for the encoded first region of the projection image, and information about the clipping region of the 360-degree image.

BRIEF DESCRIPTION OF DRAWINGS

FIG. 20 illustrates a process of determining a depth of a coding unit as a shape and size of the coding unit change, when the coding unit is recursively split such that a plurality of coding units are determined, according to an embodiment.

BEST MODE

Figure 1:
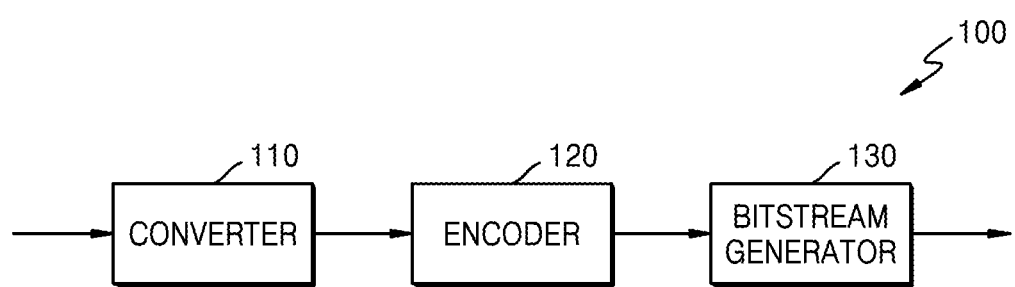
FIG. 1 is a schematic block diagram of an image encoding apparatus 100 according to an embodiment.

An image decoding method according to an embodiment includes: obtaining image data from a bitstream; decoding a first region of a projection image corresponding to a non-clipping region of a 360-degree image from the image data; obtaining information about a clipping region of the 360-degree image from the bitstream; determining a second region of the projection image, based on the information about the clipping region; and converting the projection image including the first region and the second region into the 360-degree image.

In the image decoding method according to an embodiment, the clipping region may include at least one of a first spherical segment of one base generated when an upper sphere of the 360-degree image is cut along a horizontal plane and a second spherical segment of one base generated when a lower sphere of the 360-degree image is cut along a horizontal plane.

In the image decoding method according to an embodiment, the information about the clipping region may include at least one of information about a first angle formed between a top point on the 360-degree image and a point on a circumference of a base side of the first spherical segment of one base with respect to an inside center point of the 360-degree image, and information about a second angle formed between the top point and a point on a circumference of a base side of the second spherical segment of one base with respect to the inside center point.

In the image decoding method according to an embodiment, the information about the clipping region may have been stored in at least one of a video parameter set and a supplemental enhancement information (SEI) message in the bitstream.

The image decoding method according to an embodiment may further include determining pixel values of pixels of the second region, by using pixel values of pixels of the first region, which are adjacent to the second region.

The image decoding method according to an embodiment may further include: obtaining information indicating whether the 360-degree image includes the clipping region; and determining whether to obtain information about the clipping region, according to the information indicating whether the 360-degree image includes the clipping region.

In the image decoding method according to an embodiment, the projection image may be an image obtained by projecting the 360-degree image using any one of equirectangular projection, icosahedral projection, cubemap projection, octahedron projection, and rotated sphere projection.

An image decoding apparatus according to an embodiment includes: a data obtainer configured to obtain image data and information about a clipping region of a 360-degree image from a bitstream; a decoder configured to decode a first region of a projection image corresponding to a non-clipping region of the 360-degree image from the image data, and to determine a second region of the projection image, based on the information about the clipping region; and a converter configured to convert the projection image including the first region and the second region into the 360-degree image.

In the image decoding apparatus according to an embodiment, the clipping region may include at least one of a first spherical segment of one base generated when an upper sphere of the 360-degree image is cut along a horizontal plane and a second spherical segment of one base generated when a lower sphere of the 360-degree image is cut along a horizontal plane.

In the image decoding apparatus according to an embodiment, the decoder may determine pixel values of pixels of the second region, by using pixel values of pixels of the first region, which are adjacent to the second region.

An image encoding method according to an embodiment includes: determining a clipping region and a non-clipping region in a 360-degree image; converting the 360-degree image into a projection image; encoding a first region of the projection image corresponding to the non-clipping region of the 360-degree image; and generating a bitstream including image data for the encoded first region of the projection image, and information about the clipping region of the 360-degree image.

In the image encoding method according to an embodiment, the clipping region may include at least one of a first spherical segment of one base generated when an upper sphere of the 360-degree image is cut along a horizontal plane and a second spherical segment of one base generated when a lower sphere of the 360-degree image is cut along a horizontal plane.

In the image encoding method according to an embodiment, the information about the clipping region may include at least one of information about a first angle formed between a top point on the 360-degree image and a point on a circumference of a base side of the first spherical segment of one base with respect to an inside center point of the 360-degree image, and information about a second angle formed between the top point and a point on a circumference of a base side of the second spherical segment of one base with respect to the inside center point.

In the image encoding method according to an embodiment, the information about the clipping region may be stored in at least one of a video parameter set and a supplemental enhancement information (SEI) message in the bitstream.

In the image encoding method according to an embodiment, the projection image may be an image obtained by projecting the 360-degree image using any one of equirectangular projection, icosahedral projection, cubemap projection, octahedron projection, and rotated sphere projection.

An image encoding apparatus according to an embodiment includes: a converter configured to determine a clipping region and a non-clipping region in a 360-degree image and to convert the 360-degree image into a projection image; an encoder configured to encode a first region of the projection image corresponding to the non-clipping region of the 360-degree image; and a bitstream generator configured to generate a bitstream including image data for the encoded first region of the projection image, and information about the clipping region of the 360-degree image.

MODE OF DISCLOSURE

Advantages and features of disclosed embodiments and a method of achieving the advantages and features will be apparent by referring to embodiments described below in connection with the accompanying drawings. However, the present disclosure is not restricted by these embodiments but can be implemented in many different forms, and the present embodiments are provided to complete the present disclosure and to allow those having ordinary skill in the art to understand the scope of the disclosure.

Terms used in this specification will be briefly described, and the disclosed embodiments will be described in detail.

Although general terms being widely used in the present specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It is to be understood that the singular forms "a," "an," and "the" include plural referents unless the context clearly dictates otherwise.

It will be understood that when a certain part "includes" a certain component, the part does not exclude another component but can further include another component, unless the context clearly dictates otherwise. As used herein, the terms "portion", "module", or "unit" refers to a unit that can perform at least one function or operation, and may be implemented as a software or hardware component such as a Field Programmable Gate Array (FPGA) or an Application Specific Integrated Circuit (ASIC). However, the term "portion", "module" or "unit" is not limited to software or hardware. The "portion", "module", or "unit" may be configured in an addressable storage medium, or may be configured to run on at least one processor. Therefore, as an example, the "portion", "module", or "unit" includes: components such as software components, object-oriented software components, class components, and task components; processors, functions, attributes, procedures, sub-routines, segments of program codes, drivers, firmware, microcodes, circuits, data, databases, data structures, tables, arrays, and variables. Functions provided in the components and "portions", "modules" or "units" may be combined into a smaller number of components and "portions", "modules" and "units", or sub-divided into additional components and "portions", "modules" or "units".

Hereinafter, an "image" may represent a static image such as a still image of video, or a moving image, that is, a dynamic image such as video itself.

Hereinafter, a "sample", which is data assigned to a sampling location of an image, means data that is to be processed. For example, pixel values in an image of a spatial region and convert coefficients on a convert region may be samples. A unit including at least one of the samples may be defined as a block.

Hereinafter, embodiments will be described in detail with reference to the accompanying drawings so that the present disclosure may be readily implemented by one of ordinary skill in the technical field to which the present disclosure pertains. Also, in the drawings, parts irrelevant to the description will be omitted for the simplicity of explanation.

Hereinafter, an image encoding apparatus, an image decoding apparatus, an image encoding method, and an image decoding method, according to embodiments, will be described with reference to FIGS. 1 to 23. A method and apparatus for encoding or decoding a 360-degree image, according to an embodiment, will be described with reference to FIGS. 1 to 9, below, and a method for determining a data unit that is used in a process of decoding an image by an image decoding apparatus 200 according to an embodiment will be described with reference to FIGS. 10 to 23, below.

Hereinafter, a method and apparatus for encoding or decoding a 360-degree image, according to an embodiment of the present disclosure, will be described with reference to FIGS. 1 to 9.

FIG. 1 is a schematic block diagram of an image encoding apparatus 100 according to an embodiment.

The image encoding apparatus 100 according to an embodiment may include a converter 110, an encoder 120, and a bitstream generator 130.

According to an embodiment, the converter 110 may determine a clipping region and a non-clipping region in a 360-degree image, and convert the 360-degree image into a projection image.

According to an embodiment, the clipping region may include at least one of a first spherical segment of one base generated when an upper sphere of the 360-degree image is cut along a horizontal plane and a second spherical segment of one base generated when a lower sphere of the 360-degree image is cut along a horizontal plane.

According to an embodiment, the non-clipping region of the 360-degree image may be a remaining region except for the clipping region. When there is no clipping region on the 360-degree image, the non-clipping region may be an entire region of the 360-degree image.

According to an embodiment, the projection image may be an image obtained by projecting the 360-degree image using any one of equirectangular projection, icosahedral projection, cubemap projection, octahedron projection, and rotated sphere projection.

According to an embodiment, the encoder 120 may encode a first region of the projection image corresponding to the non-clipping region of the 360-degree image.

According to an embodiment, the encoder 120 may not encode a second region corresponding to the clipping region of the 360-degree image according to projection of the 360-degree image.

According to an embodiment, the bitstream generator 130 may generate a bitstream including image data for the encoded first region of the projection image, and information about the clipping region of the 360-degree image.

According to an embodiment, the information about the clipping region may include at least one of information about a first angle formed between a top point on the 360-degree image and a point on a circumference of a base side of the first spherical segment of one base with respect to an inside center point of the 360-degree image, and information about a second angle formed between the top point and a point on a circumference of a base side of the second spherical segment of one base with respect to the inside center point.

According to an embodiment, the information about the clipping region may be stored in at least one of a video parameter set and a supplemental enhancement information (SEI) message in the bitstream.

According to an embodiment, whether the 360-degree image includes a clipping region may be determined, and information indicating whether the 360-degree image includes a clipping region may be further included in the bitstream.

Figure 2:
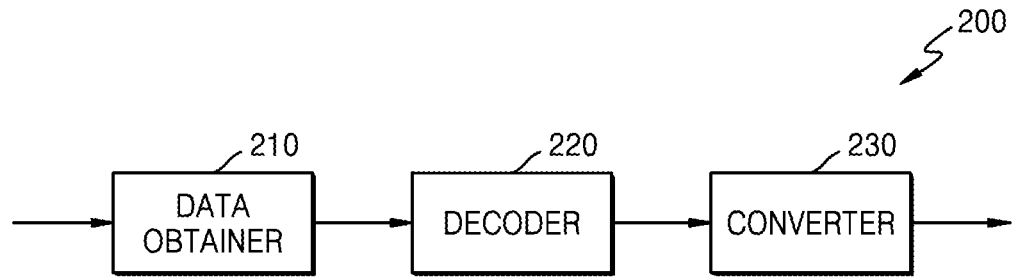
FIG. 2 is a schematic block diagram of an image decoding apparatus 200 according to an embodiment.

FIG. 2 is a schematic block diagram of an image decoding apparatus 200 according to an embodiment.

Referring to FIG. 2, the image decoding apparatus 200 according to an embodiment of the present disclosure may include a data obtainer 210, a decoder 220, and a converter 230.

The data obtainer 210 according to an embodiment may parse a bitstream received by the image decoding apparatus 200 to obtain image data and information about a clipping region of a 360-degree image from the bitstream, and output the image data and the information about the clipping region of the 360-degree image to the decoder 220 and the converter 230.

According to an embodiment, the clipping region may include at least one of a first spherical segment of one base generated when an upper sphere of the 360-degree image is cut along a horizontal plane and a second spherical segment of one base generated when a lower sphere of the 360-degree image is cut along a horizontal plane.

According to an embodiment, the information about the clipping region may include at least one of information about a first angle formed between a top point on the 360-degree image and a point on a circumference of a base side of the first spherical segment of one base with respect to an inside center point of the 360-degree image, and information about a second angle formed between the top point and a point on a circumference of a base side of the second spherical segment of one base with respect to the inside center point.

According to an embodiment, the information about the clipping region may have been stored in at least one of a video parameter set and a supplemental enhancement information (SEI) message in the bitstream.

According to an embodiment, information indicating whether the 360-degree image includes a clipping region may be further obtained from the bitstream, and whether to obtain information about the clipping region may be determined according to the obtained information.

The decoder 220 according to an embodiment may decode a first region of a projection image corresponding to a non-clipping region of the 360-degree image from the image data, and determine a second region of the projection image, based on the information about the clipping region.

According to an embodiment, the non-clipping region of the 360-degree image may be a remaining region except for the clipping region. When there is no clipping region on the 360-degree image, the non-clipping region may be an entire region of the 360-degree image.

According to an embodiment, the second region of the projection image may be a region corresponding to the clipping region of the 360-degree image according to conversion of the projection image.

According to an embodiment, pixel values of pixels of the second region may be determined using pixel values of pixels of the first region, which are adjacent to the second region of the projection image.

The converter 230 according to an embodiment may convert the projection image including the first region and the second region into the 360-degree image. According to an embodiment, the projection image may be an image obtained by projecting the 360-degree image using any one of equirectangular projection, icosahedral projection, cubemap projection, octahedron projection, and rotated sphere projection. However, projection methods are not limited to the above-mentioned methods, and other various projection methods may be used. According to an embodiment, the projection image may be a planar, rectangular image.

Figure 3A:
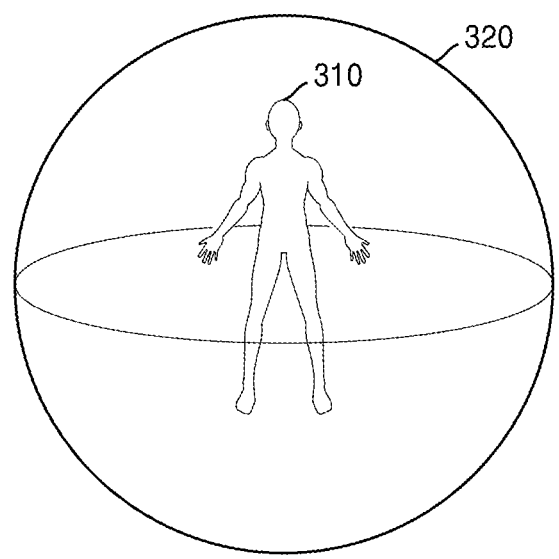
FIG. 3A shows a 360-degree image according to an embodiment.

FIG. 3A shows a 360-degree image according to an embodiment.

As shown in FIG. 3A, a 360-degree image 320 may be an image showing an ambient environment surrounding a predetermined location 310 at 360 degrees with the predetermined location 310 at the center. According to an embodiment, the 360-degree image 320 may be in the shape of a sphere. When a user wears a VR apparatus, an image showing an ambient environment surrounding the user at 360 degrees in VR may be a 360-degree image. The VR apparatus may provide a 360-degree image to the user so as to provide, even when the user wearing the VR apparatus moves or turns his/her eyes in VR, an appropriate image for the corresponding situation.

Figure 3B:
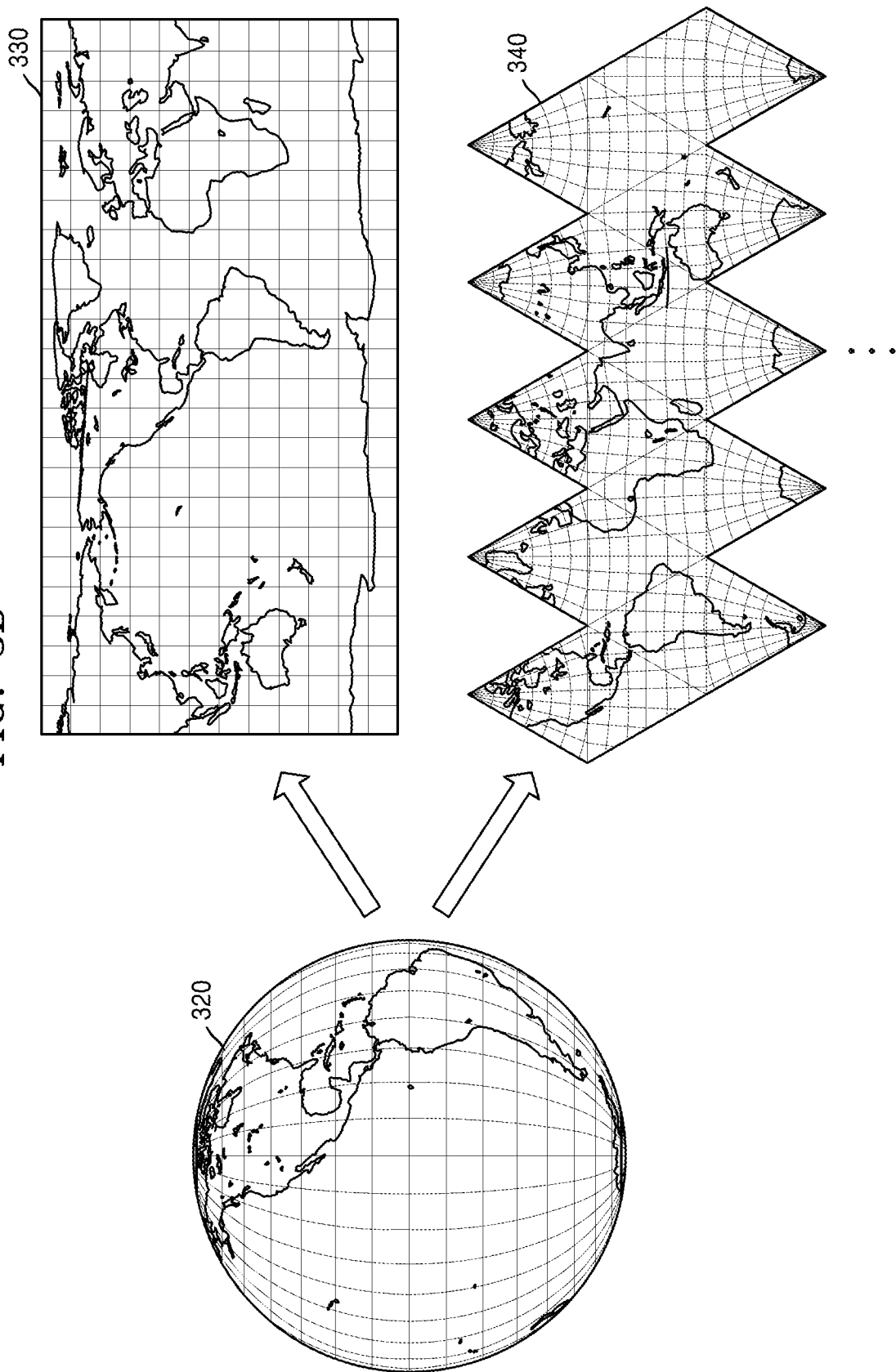
FIG. 3B shows projection images created by projecting a 360-degree image by using projection methods according to various embodiments.

FIG. 3B shows projection images created by projecting a 360-degree image by using projection methods according to various embodiments.

Because it is difficult to encode a 360-degree image itself, a 360-degree image may be converted into a planar image for encoding/decoding. Referring to FIG. 3A, the 360-degree image 320 as described above may be projected through various projection methods to be converted into a planar image. As shown in FIG. 3B, the 360-degree image 320 may be projected by using the equirectangular projection to be converted into a projection image 330 in the shape of a rectangle. Also, the 360-degree image 320 may be projected by using the icosahedral projection to be converted into a projection image 340 in the shape of a planar figure of an icosahedron. Meanwhile, although not shown in FIG. 3B, projection methods for generating projection images are not limited to the equirectangular projection and icosahedral projection mentioned above, and various projection methods may be used. Projection methods according to various embodiments may be octahedron projection, cubemap projection and rotated sphere projection, and a projection image may be created in different shapes according to projection methods. A projection image generated according to the rotated sphere projection may be in the shape of a rectangle having an aspect ratio of 3:2, like the cubemap projection, and the projection image may be configured with two symmetrical successive segments divided vertically. Edge regions of each segment may remain as they are or be gray-processed in the shape of arcs. According to an embodiment, a projection image created by using various projection methods may be reconfigured to a rectangular shape by adding spaces.

Figure 4A:
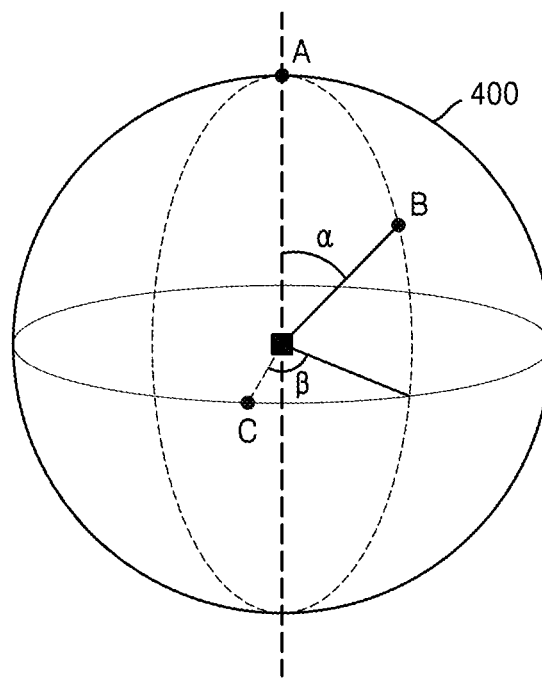
FIGS. 4A and 4B show a 360-degree image and a projection image corresponding to the 360-degree image, according to an embodiment.
Figure 4B:
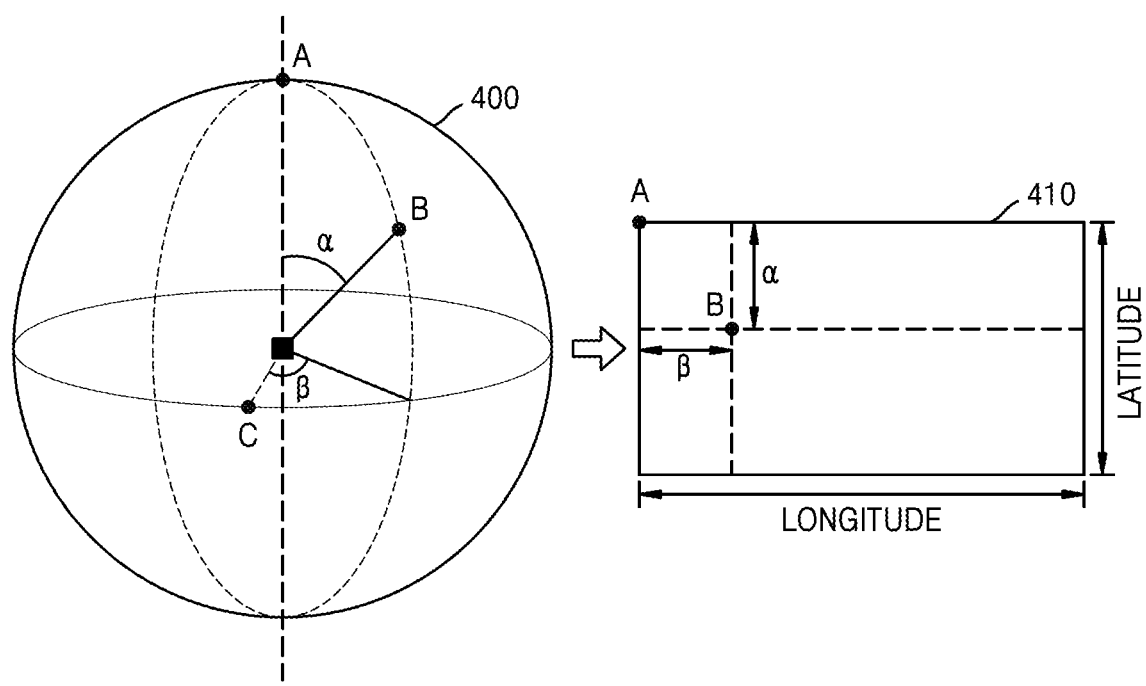

FIGS. 4A and 4B show a 360-degree image and a projection image corresponding to the 360-degree image, according to an embodiment.

As shown in FIG. 4A, a 360-degree image may have a top point A at the top, and a predetermined point B on the 360-degree image 400 may be selected. A predetermined angle corresponding to the selected predetermined point B may be determined. The predetermined angle may include a horizontal angle and a vertical angle.

According to an embodiment, a vertical angle α formed by a straight line passing an inside center point of the 360-degree image 400 and the predetermined point B with respect to a straight line passing the inside center point and the top point A may be determined. The horizontal angle α may be determined in the range of 0 degrees to 180 degrees according to the selected predetermined point B. According to an embodiment, the vertical angle α may correspond to a latitude ranging from 0 degrees to 180 degrees with respect to the top point A on the 360-degree image 400.

According to an embodiment, on a horizontal plane passing the center of the 360-degree image 400, a horizontal angle β formed between a projection point of the predetermined point B and a front reference point C with respect to the inside center point may be determined. The horizontal angle β may be determined in the range of 0 degrees to 360 degrees according to the predetermined point B. According to an embodiment, the horizontal angle β may correspond to a longitude ranging from 0 degrees to 360 degrees with respect to the front reference point C on the 360-degree image 400.

As shown in FIG. 4B, a relation between the top point A and the predetermined point B on the 360-degree image 400 described above with reference to FIG. 4A may be expressed as a relation between a left upper edge A and a predetermined point B on a projection image 410 corresponding to the 360-degree image 400, according to conversion of the 360-degree image 400. The vertical angle α and the horizontal angle β of the 360-degree image 400 as described above with reference to FIG. 4A may respectively correspond to a vertical distance and a horizontal distance between the left upper edge A and the predetermined point B on the projection image 410. Also, a horizontal length and a vertical length of the projection image 410 may respectively correspond to an entire longitude and an entire latitude of the 360-degree image 400. When a predetermined point having a longitude and a latitude on the 360-degree image 400 is selected, a predetermined point B having a horizontal-axis coordinate corresponding to the longitude and a vertical-axis coordinate corresponding to the latitude on the corresponding projection image 410 may be selected.

Figure 5A:
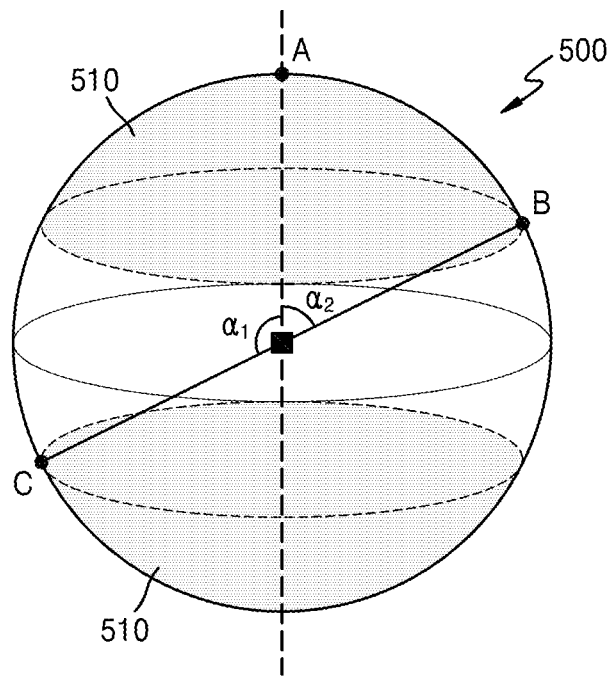
FIGS. 5A and 5B show a 360-degree image including a clipping region and a projection image corresponding to the 360-degree image, according to an embodiment.
Figure 5B:
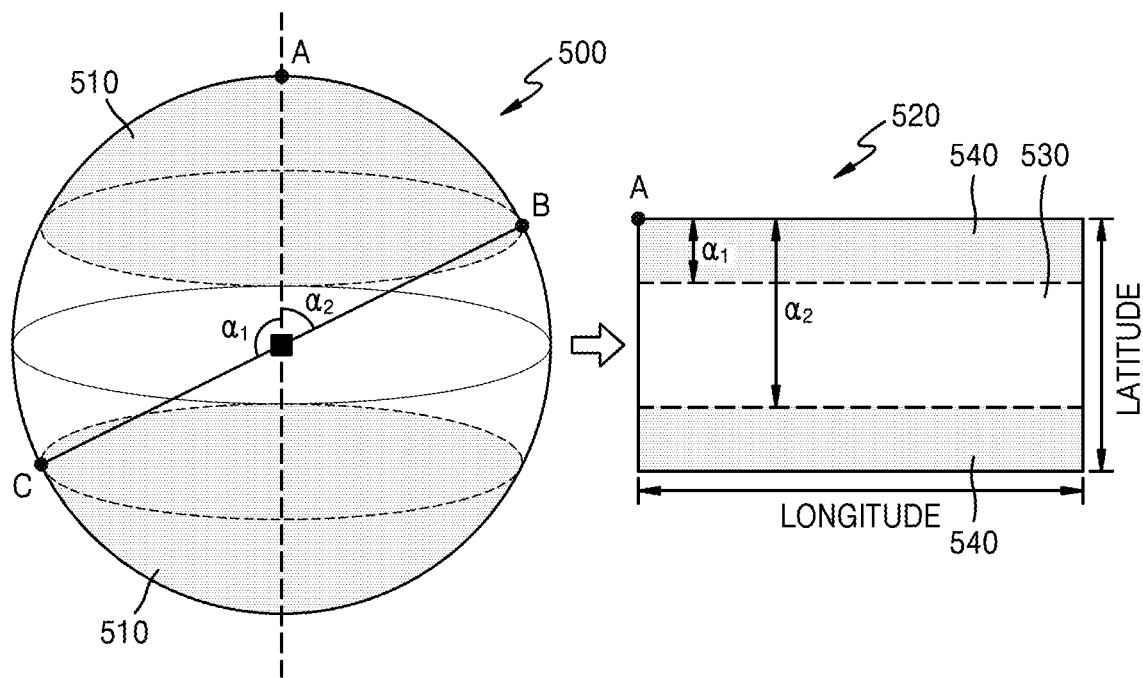

FIGS. 5A and 5B show a 360-degree image including a clipping region and a projection image corresponding to the 360-degree image, according to an embodiment.

As shown in FIG. 5A, a 360-degree image 500 may have a clipping region 510 corresponding to a shaded region. The 360-degree image 500 may have a non-clipping region which is the remaining region except for the clipping region 510. The clipping region 510 may include a first spherical segment of one base generated when an upper sphere of the 360-degree image 500 is cut along a horizontal plane and a second spherical segment of one base generated when a lower sphere of the 360-degree image 500 is cut along a horizontal plane.

Referring to FIG. 5A, after the clipping region 510 of the 360-degree image is determined, a first angle α1 formed between a top point A of the 360-degree image 500 and a point B on a circumference of a base side of the first spherical segment of one base with respect to an inside center point of the 360-degree image 500, and a second angle α2 formed between the top point A and a point C on a circumference of a base side of the second spherical segment with respect to the inside center point may be determined. The first angle α1 may be a lowest latitude among latitudes of 0 degrees to 180 degrees of the clipping region 510 included in the upper sphere of the 360-degree image 500, and the second angle α2 may be a highest latitude among latitudes of 0 degrees to 180 degrees of the clipping region 510 included in the lower sphere of the 360-degree image 500.

As shown in FIG. 5B, the 360-degree image 500 may be converted into a projection image 520 through various projection methods. According to conversion of the 360-degree image 500, the 360-degree image 500 may correspond to the projection image 520.

Referring to FIG. 5B, the projection image 520 may include a first region 530 corresponding to the non-clipping region of the 360-degree image 500, and a second region 540 corresponding to the clipping region 510 of the 360-degree image 500. The top point A of the 360-degree image 500 may correspond to a left upper edge A of the projection image 520.

The first angle α1 related to the clipping region 510 of the 360-degree image 500 described above with reference to FIG. 5A may correspond to a height of the upper part of the second region 540 of the projection image 520, and the second angle α2 may correspond to a length resulting from subtracting a height of a lower part of the second region 540 from a vertical length of the projection image 520.

Figures 6, 7:
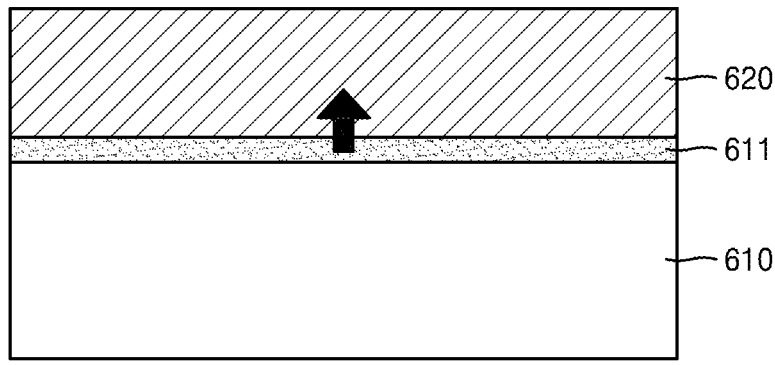
FIG. 6 is a view for describing padding a region of a projection image, according to an embodiment.
FIG. 7 shows syntax related to a clipping region of a 360-degree image, according to an embodiment.

FIG. 6 is a view for describing padding a region of a projection image, according to an embodiment.

As shown in FIG. 6, a projection image may include a first region 610 corresponding to a non-clipping region of a 360-degree image and a second region 620 corresponding to a clipping region of the 360-degree image, according to conversion of the 360-degree image.

According to an embodiment, the first region 610 of the projection image may be decoded based on image data obtained from a bitstream during a decoding process. The second region 620 of the projection image may be determined based on information about the clipping region of the 360-degree image obtained from the bitstream.

Referring to FIG. 6, pixel values of pixels of the second region 620 may be determined using pixel values of adjacent pixels 611 adjacent to the second region 620 among pixels of the first region 610. Pixel values of the pixels of the second region 620 may be determined by using various methods. For example, pixel values of the adjacent pixels 611 may be propagated at a predetermined angle with respect to the second region 620 to determine pixel values of the pixels of the second region 620. Alternatively, a mean value or an interpolated value of the pixel values of the adjacent pixels 611 may be used.

FIG. 7 shows syntax related to a clipping region of a 360-degree image, according to an embodiment.

According to an embodiment, a bitstream may be configured with a plurality of network abstraction layer (NAL) units, and at least one of the NAL units may be a raw byte sequence payload (RBSP) region of a video parameter set. Information included in the video parameter set may be applied to an intra random access point (IRAP) picture and pictures in a coded video sequence (CVS) including subsequent pictures which are not an RAP picture, according to a decoding order. The information included in the video parameter set may be applied to sequence levels of the pictures.

As shown in FIG. 7, according to an embodiment, a 1-bit flag "vps_360_extension_flag" indicating whether an image to be decoded is a projection image of a 360-degree image may be obtained from an RBSP region of a video parameter set. When a value of "vps_360_extension_flag" is 1, syntax "vps_360_extension( )" may be called so that information related to the 360-degree image may be obtained subsequently.

As shown in FIG. 7, when the syntax "vps_360_extension( )" is called, a 1-bit flag "vps_top_clip_flag" indicating whether an upper sphere of the 360-degree image includes a clipping region may be obtained, and when "vps_top_clip_flag" is 1, "start_top_angle" representing information about the clipping region included in the upper sphere of the 360-degree image may be obtained.

According to an embodiment, the clipping region included in the upper sphere of the 360-degree image may be a first spherical segment of one base generated when an upper sphere of the 360-degree image is cut along a horizontal plane, and the "start_top_angle" may represent information about a first angle formed between a top point of the 360-degree image and a point on a circumference of a base side of the first spherical segment of one base with respect to an inside center point of the 360-degree image. The "start_top_angle" may represent a lowest latitude among latitudes of 0 degrees to 180 degrees of the clipping region included in the upper sphere of the 360-degree image.

Referring again to FIG. 7, after the "start_top_angle" is obtained, syntax "fill_top_region( )" may be called, and additional information for determining pixel values of a region of a projection image corresponding to the clipping region included in the upper sphere of the 360-degree image may be obtained from the syntax "fill_top_region( )".

Referring again to FIG. 7, when syntax "vps_360_extension( )" is called, a 1-bit flag "vps_bottom_clip_flag" indicating whether a lower sphere of the 360-degree image includes a clipping region may be obtained, and when the "vps_bottom_clip_flag" is 1, "start_bottom_angle" representing information about the clipping region included in the lower sphere of the 360-degree image may be obtained.

According to an embodiment, the clipping region included in the lower sphere of the 360-degree image may be a second spherical segment of one base generated when the lower sphere of the 360-degree image is cut along a horizontal plane, and "start_bottom_angle" may represent information about a second angle formed between a top point on the 360-degree image and a point on a circumference of a base side of the second spherical segment of one base with respect to the inside center point of the 360-degree image. The "start_bottom_angle" may represent a highest latitude among latitudes of 0 degrees to 180 degrees of the clipping region included in the lower sphere of the 360-degree image.

Referring again to FIG. 7, after the "start_bottom_angle" is obtained, syntax "fill_bottom_region( )" may be called, additional information for determining pixel values of a region of the projection image corresponding to the clipping region included in the lower sphere of the 360-degree image may be obtained from the syntax "fill_bottom_region( )".

According to another embodiment, instead that "start_top_angle" and "start_bottom_angle" representing information about clipping regions included in the upper and lower spheres of the 360-degree image are obtained separately, single information for the clipping regions included in the 360-degree image may be obtained.

Although not shown in FIG. 7, according to an embodiment, "start_top_angle" and "start_bottom_angle" representing information about the clipping regions included in the upper and lower spheres of the 360-degree image may be obtained from a SEI message in the bitstream. The SEI message may include time information and additional information related to a screen display of decoded data.

Figure 8:
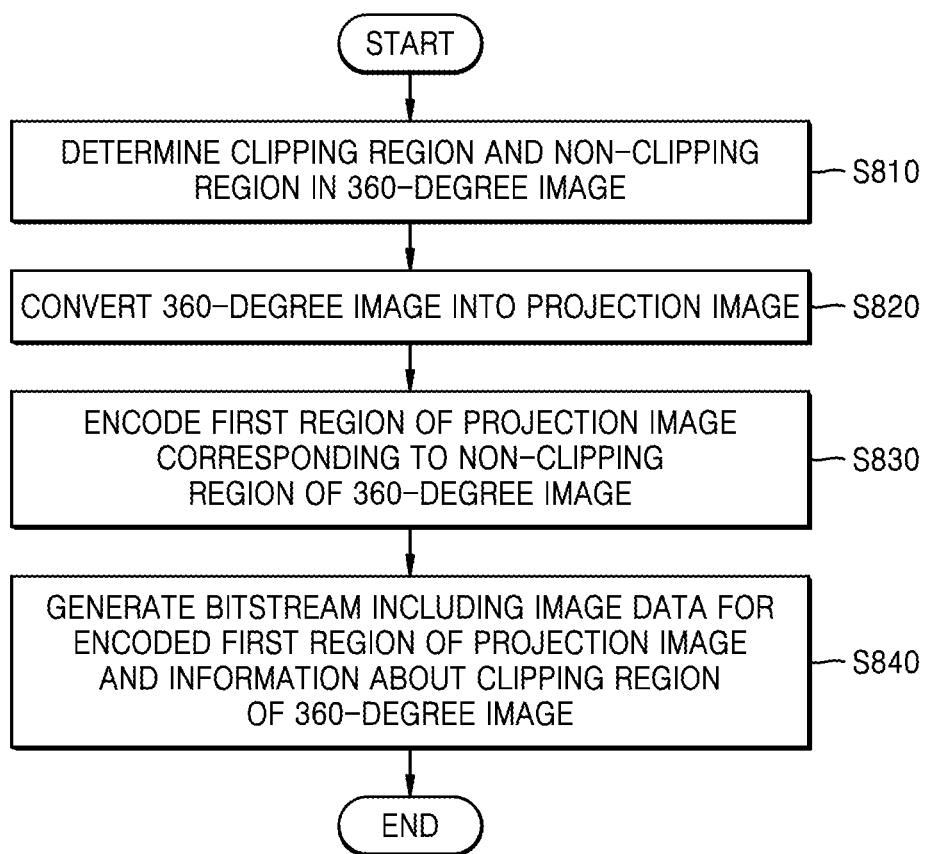
FIG. 8 shows a flowchart for describing an image encoding method according to an embodiment.

FIG. 8 shows a flowchart for describing an image encoding method according to an embodiment.

In operation S810, a clipping region and a non-clipping region in a 360-degree image may be determined.

According to an embodiment, the clipping region may include at least one of a first spherical segment of one base generated when an upper sphere of the 360-degree image is cut along a horizontal plane and a second spherical segment of one base generated when a lower sphere of the 360-degree image is cut along a horizontal plane.

According to an embodiment, the non-clipping region of the 360-degree image may be a remaining region except for the clipping region. When there is no clipping region on the 360-degree image, the non-clipping region may be an entire region of the 360-degree image.

In operation S820, the 360-degree image may be converted into a projection image. According to an embodiment, the projection image may be an image obtained by projecting the 360-degree image using any one of equirectangular projection, icosahedral projection, cubemap projection, octahedron projection, and rotated sphere projection.

In operation S830, a first region of the projection image corresponding to the non-clipping region of the 360-degree image may be encoded.

According to an embodiment, a second region corresponding to the clipping region of the 360-degree image may not be encoded according to projection of the 360-degree image.

In operation S840, a bitstream including image data for the encoded first region of the projection image and information about the clipping region of the 360-degree image may be generated.

According to an embodiment, the information about the clipping region may include at least one of information about a first angle formed between a top point on the 360-degree image and a point on a circumference of a base side of the first spherical segment of one base with respect to an inside center point of the 360-degree image, and information about a second angle formed between the top point and a point on a circumference of a base side of the second spherical segment of one base with respect to the inside center point.

According to an embodiment, the information about the clipping region may be stored in at least one of a video parameter set and a supplemental enhancement information (SEI) message in the bitstream.

According to an embodiment, whether the 360-degree image includes a clipping region may be determined, and information indicating whether the 360-degree image includes a clipping region may be further included in the bitstream.

Figure 9:
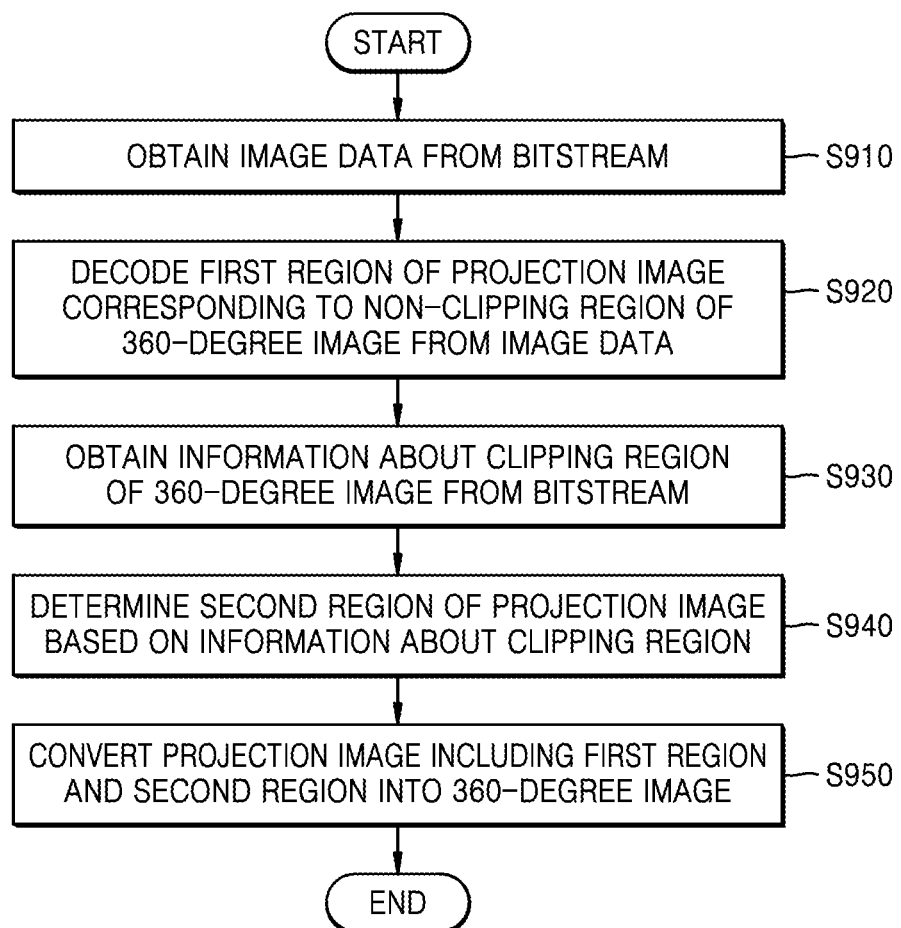
FIG. 9 shows a flowchart for describing an image decoding method according to an embodiment.

FIG. 9 shows a flowchart for describing an image decoding method according to an embodiment.

In operations S910 and 920, image data may be obtained from a bitstream, and a first region of a projection image corresponding to a non-clipping region of a 360-degree image may be decoded from the image data. According to an embodiment, the non-clipping region of the 360-degree image may be a remaining region except for a clipping region. When there is no clipping region on the 360-degree image, the non-clipping region may be an entire region of the 360-degree image.

In operation S930, information about the clipping region of the 360-degree image may be obtained from the bitstream.

According to an embodiment, the clipping region may include at least one of a first spherical segment of one base generated when an upper sphere of the 360-degree image is cut along a horizontal plane and a second spherical segment of one base generated when a lower sphere of the 360-degree image is cut along a horizontal plane.

According to an embodiment, the information about the clipping region may include at least one of information about a first angle formed between a top point on the 360-degree image and a point on a circumference of a base side of the first spherical segment of one base with respect to an inside center point of the 360-degree image, and information about a second angle formed between the top point and a point on a circumference of a base side of the second spherical segment of one base with respect to the inside center point.

According to an embodiment, the information about the clipping region may have been stored in at least one of a video parameter set and a supplemental enhancement information (SEI) message in the bitstream.

According to an embodiment, information indicating whether the 360-degree image includes a clipping region may be further obtained from the bitstream, and whether to obtain information about the clipping region may be determined according to the obtained information.

In operation S940, a second region of the projection image may be determined based on the information about the clipping region.

According to an embodiment, the second region of the projection image may be a region corresponding to the clipping region of the 360-degree image according to conversion of the projection image.

According to an embodiment, pixel values of pixels of the second region may be determined using pixel values of pixels of the first region that is adjacent to the second region of the projection image.

In operation S950, the projection image including the first region and the second region may be converted into the 360-degree image. According to an embodiment, the projection image may be an image obtained by projecting the 360-degree image using any one of equirectangular projection, icosahedral projection, cubemap projection, octahedron projection, and rotated sphere projection. However, projection methods are not limited to the above-mentioned methods, and other various projection methods may be used. According to an embodiment, the projection image may be a planar, rectangular image.

Hereinafter, a method of determining a data unit of an image according to an embodiment will be described with reference to FIGS. 10 to 23.

Figure 10:
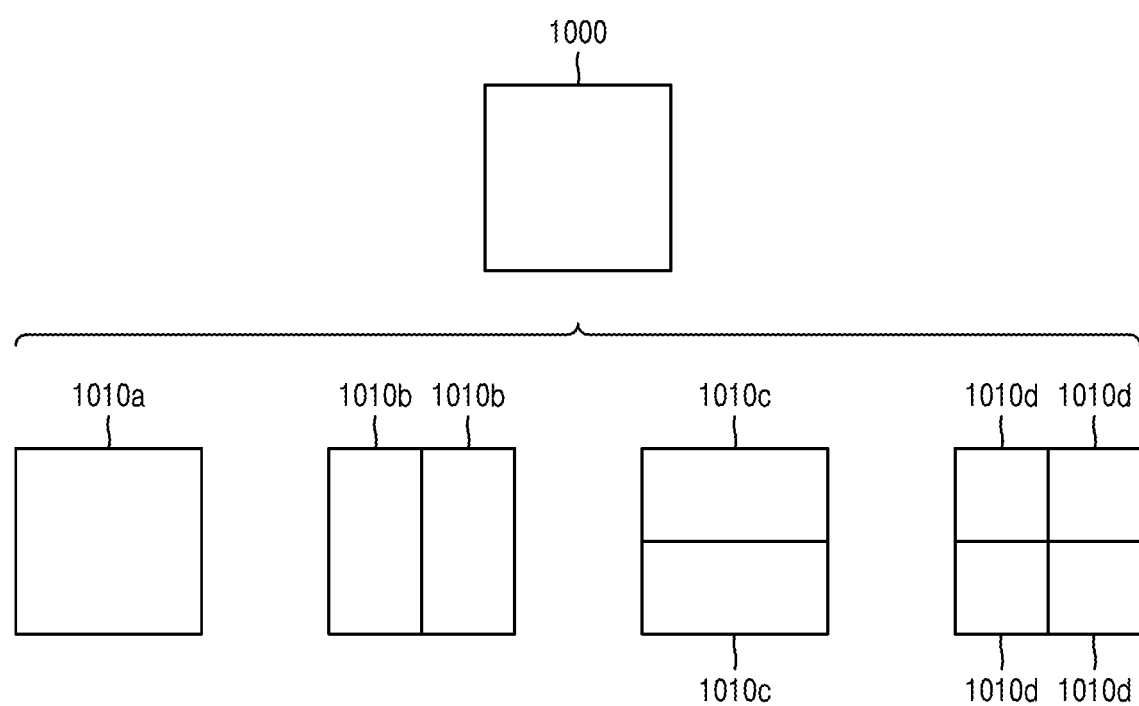
FIG. 10 illustrates a process of determining at least one coding unit by splitting a current coding unit, according to an embodiment.

FIG. 10 illustrates a process, performed by the image decoding apparatus 200, of determining at least one coding unit by splitting a current coding unit, according to an embodiment.

According to an embodiment, the image decoding apparatus 200 may determine a shape of a coding unit by using block shape information, and may determine a splitting method of the coding unit by using split shape information. That is, a coding unit splitting method indicated by the split shape information may be determined based on a block shape indicated by the block shape information used by the image decoding apparatus 200.

According to an embodiment, the image decoding apparatus 200 may use the block shape information indicating that the current coding unit has a square shape. For example, the image decoding apparatus 200 may determine whether not to split a square coding unit, whether to vertically split the square coding unit, whether to horizontally split the square coding unit, or whether to split the square coding unit into four coding units, based on the split shape information. Referring to FIG. 10, when the block shape information of a current coding unit 1000 indicates a square shape, a decoder 1030 may determine that a coding unit 1010a having the same size as the current coding unit 1000 is not split, based on the split shape information indicating not to perform splitting, or may determine coding units 1010b, 1010c, or 1010d split based on the split shape information indicating a predetermined splitting method.

Referring to FIG. 10, according to an embodiment, the image decoding apparatus 200 may determine two coding units 1010b obtained by splitting the current coding unit 1000 in a vertical direction, based on the split shape information indicating to perform splitting in a vertical direction. The image decoding apparatus 200 may determine two coding units 1010c obtained by splitting the current coding unit 1000 in a horizontal direction, based on the split shape information indicating to perform splitting in a horizontal direction. The image decoding apparatus 200 may determine four coding units 1010d obtained by splitting the current coding unit 1000 in vertical and horizontal directions, based on the split shape information indicating to perform splitting in vertical and horizontal directions. However, splitting methods of the square coding unit are not limited to the above-described methods, and the split shape information may indicate various methods. Predetermined splitting methods of splitting the square coding unit will be described in detail below in relation to various embodiments.

Figure 11:
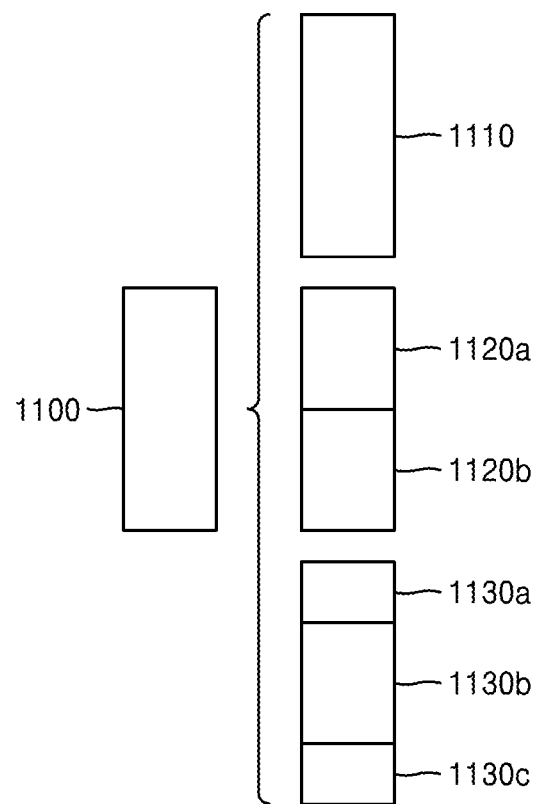
FIG. 11 illustrates a process of determining at least one coding unit by splitting a non-square coding unit, according to an embodiment.
Figure 11:
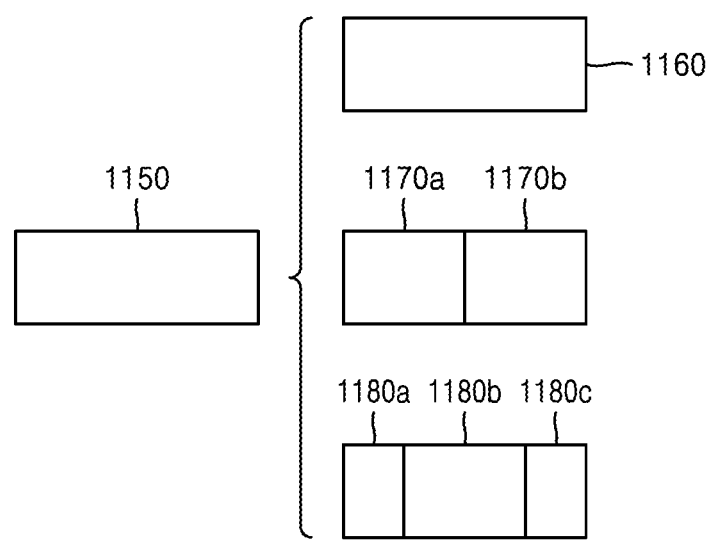

FIG. 11 illustrates a process, performed by the image decoding apparatus 200, of determining at least one coding unit by splitting a non-square coding unit, according to an embodiment.

According to an embodiment, the image decoding apparatus 200 may use block shape information indicating that a current coding unit has a non-square shape. The image decoding apparatus 200 may determine whether not to split the non-square current coding unit or whether to split the non-square current coding unit by using a predetermined splitting method, based on split shape information. Referring to FIG. 11, when the block shape information of a current coding unit 1100 or 1150 indicates a non-square shape, the image decoding apparatus 200 may determine that a coding unit 1110 or 1160 having the same size as the current coding unit 1100 or 1150 is not split, based on the split shape information indicating not to perform splitting, or determine coding units 1120a and 1120b, 1130a to 1130c, 1170a and 1170b, or 1180a to 1180c split based on the split shape information indicating a predetermined splitting method.

Predetermined splitting methods of splitting a non-square coding unit will be described in detail below in relation to various embodiments.

According to an embodiment, the image decoding apparatus 200 may determine a splitting method of a coding unit by using the split shape information and, in this case, the split shape information may indicate the number of one or more coding units generated by splitting a coding unit. Referring to FIG. 11, when the split shape information indicates to split the current coding unit 1100 or 1150 into two coding units, the image decoding apparatus 200 may determine two coding units 1120a and 1120b, or 1170a and 1170b included in the current coding unit 1100 or 1150, by splitting the current coding unit 1100 or 1150 based on the split shape information.

According to an embodiment, when the image decoding apparatus 200 splits the non-square current coding unit 1100 or 1150 based on the split shape information, the location of a long side of the non-square current coding unit 1100 or 1150 may be considered. For example, the image decoding apparatus 200 may determine a plurality of coding units by dividing a long side of the current coding unit 1100 or 1150, in consideration of the shape of the current coding unit 1100 or 1150.

According to an embodiment, when the split shape information indicates to split a coding unit into an odd number of blocks, the image decoding apparatus 200 may determine an odd number of coding units included in the current coding unit 1100 or 1150. For example, when the split shape information indicates to split the current coding unit 1100 or 1150 into three coding units, the image decoding apparatus 200 may split the current coding unit 1100 or 1150 into three coding units 1130a, 1130b, and 1130c, or 1180a, 1180b, and 1180c. According to an embodiment, the image decoding apparatus 200 may determine an odd number of coding units included in the current coding unit 1100 or 1150, and not all the determined coding units may have the same size. For example, a predetermined coding unit 1130b or 1180b from among the determined odd number of coding units 1130a, 1130b, and 1130c, or 1180a, 1180b, and 1180c may have a size different from the size of the other coding units 1130a and 1130c, or 1180a and 1180c. In other words, coding units that may be determined by splitting the current coding unit 1100 or 1150 may have various types and sizes.

According to an embodiment, when the split shape information indicates to split a coding unit into an odd number of blocks, the image decoding apparatus 200 may determine an odd number of coding units included in the current coding unit 1100 or 1150, and may put a predetermined restriction on at least one coding unit from among the odd number of coding units generated by splitting the current coding unit 1100 or 1150. Referring to FIG. 11, the image decoding apparatus 200 may allow a decoding method of the coding unit 1130b or 1180b to be different from that of the other coding units 1130a and 1130c, or 1180a and 1180c, wherein the coding unit 1130b or 1180b is at a center location from among the three coding units 1130a, 1130b, and 1130c, or 1180a, 1180b, and 1180c generated by splitting the current coding unit 1100 or 1150. For example, the image decoding apparatus 200 may restrict the coding unit 1130b or 1180b at the center location to be no longer split or to be split only a predetermined number of times, unlike the other coding units 1130a and 1130c, or 1180a and 1180c.

Figure 12:
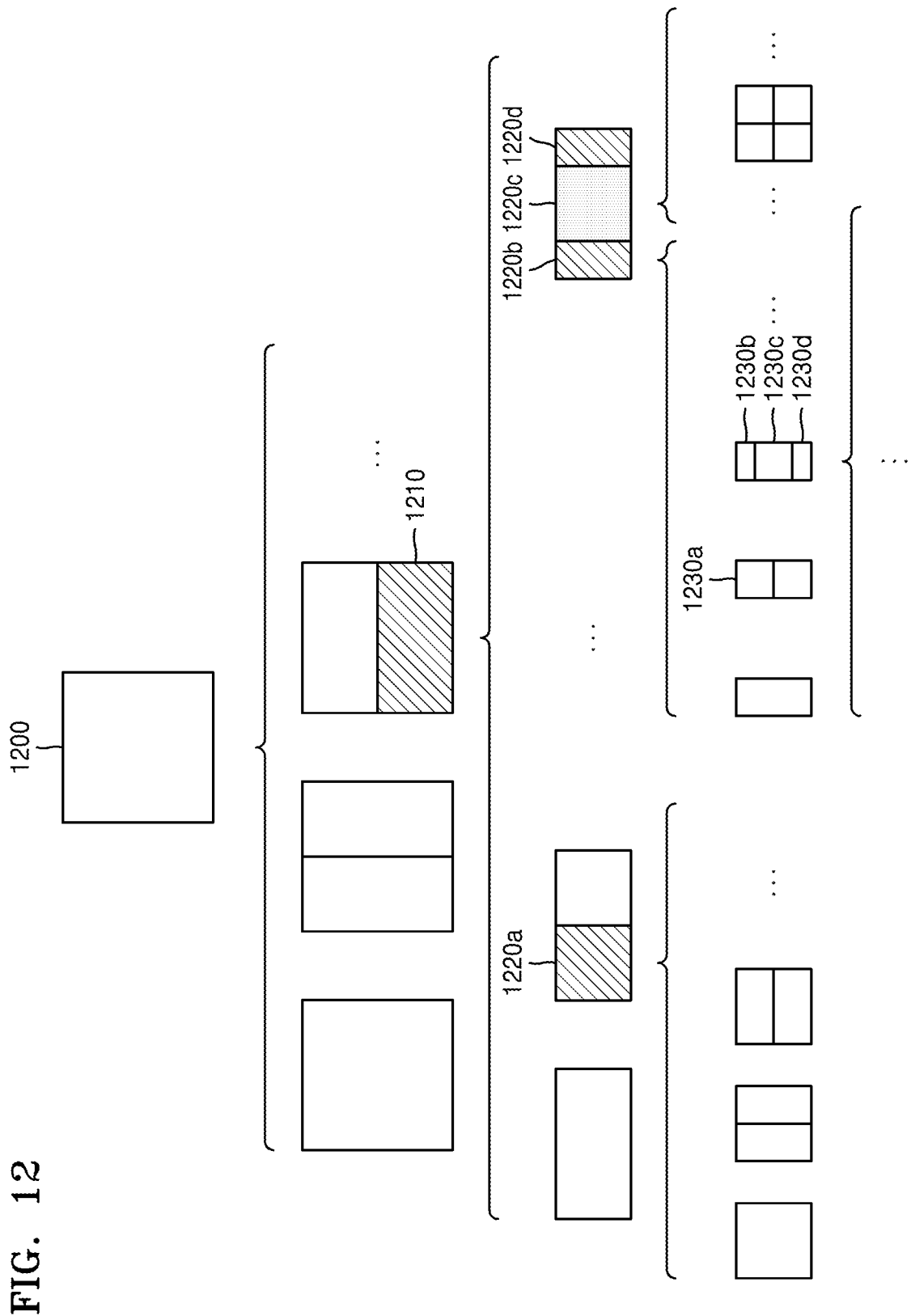
FIG. 12 illustrates a process of splitting a coding unit based on at least one of block shape information and split shape information, according to an embodiment.

FIG. 12 illustrates a process, performed by the image decoding apparatus 200, of splitting a coding unit based on at least one of block shape information and split shape information, according to an embodiment.

According to an embodiment, the image decoding apparatus 200 may determine to split or not to split a square first coding unit 1200 into coding units, based on at least one of the block shape information and the split shape information. According to an embodiment, when the split shape information indicates to split the first coding unit 1200 in a horizontal direction, the image decoding apparatus 200 may determine a second coding unit 1210 by splitting the first coding unit 1200 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 200 may determine to split or not to split the determined second coding unit 1210 into coding units, based on at least one of the block shape information and the split shape information. Referring to FIG. 12, the image decoding apparatus 200 may or may not split the non-square second coding unit 1210, which is determined by splitting the first coding unit 1200, into one or more third coding units 1220a, or 1220b, 1220c, and 1220d based on at least one of the block shape information and the split shape information. The image decoding apparatus 200 may obtain at least one of the block shape information and the split shape information, and determine a plurality of various-shaped second coding units (e.g., 1210) by splitting the first coding unit 1200, based on the obtained at least one of the block shape information and the split shape information, and the second coding unit 1210 may be split by using the splitting method of the first coding unit 1200, based on at least one of the block shape information and the split shape information. According to an embodiment, when the first coding unit 1200 is split into the second coding units 1210 based on at least one of the block shape information and the split shape information of the first coding unit 1200, the second coding unit 1210 may also be split into the third coding units 1220a, or 1220b, 1220c, and 1220d based on at least one of the block shape information and the split shape information of the second coding unit 1210. That is, a coding unit may be recursively split based on at least one of the block shape information and the split shape information of each coding unit. A method that may be used to recursively split a coding unit will be described below in relation to various embodiments.

According to an embodiment, the image decoding apparatus 200 may determine to split each of the third coding units 1220a, or 1220b, 1220c, and 1220d into coding units or not to split the second coding unit 1210, based on at least one of the block shape information and the split shape information. According to an embodiment, the image decoding apparatus 200 may split the non-square second coding unit 1210 into the odd number of third coding units 1220b, 1220c, and 1220d. The image decoding apparatus 200 may put a predetermined restriction on a predetermined third coding unit from among the odd number of third coding units 1220b, 1220c, and 1220d. For example, the image decoding apparatus 200 may restrict the third coding unit 1220c at a center location from among the odd number of third coding units 1220b, 1220c, and 1220d to be no longer split or to be split a settable number of times. Referring to FIG. 12, the image decoding apparatus 200 may restrict the third coding unit 1220c, which is at the center location from among the odd number of third coding units 1220b, 1220c, and 1220*d* included in the non-square second coding unit 1210, to be no longer split, to be split by using a predetermined splitting method (e.g., split into only four coding units or split by using a splitting method of the second coding unit 1210), or to be split only a predetermined number of times (e.g., split only n times (where n>0)). However, the restrictions on the third coding unit 1220*c* at the center location are not limited to the above-described examples, and may include various restrictions for decoding the third coding unit 1220*c* at the center location differently from the other third coding units 1220*b* and 1220*d*.

According to an embodiment, the image decoding apparatus 200 may obtain at least one of the block shape information and the split shape information, which is used to split a current coding unit, from a predetermined location in the current coding unit.

Figure 13:
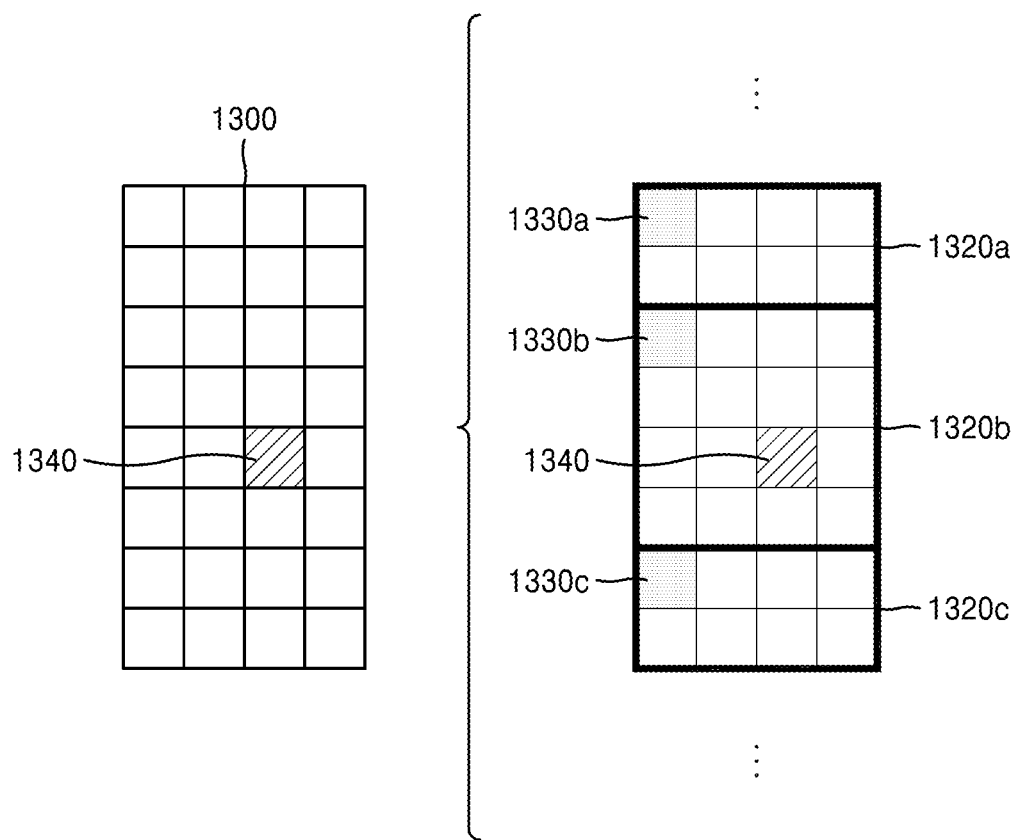
FIG. 13 illustrates a method of determining a predetermined coding unit from among an odd number of coding units, according to an embodiment.

FIG. 13 illustrates a method, performed by the image decoding apparatus 200, of determining a predetermined coding unit from among an odd number of coding units, according to an embodiment. Referring to FIG. 13, at least one of block shape information and split shape information of a current coding unit 1300 may be obtained from a sample of a predetermined location from among a plurality of samples included in the current coding unit 1300 (e.g., a sample 1340 of a center location). However, the predetermined location in the current coding unit 1300, from which at least one of the block shape information and the split shape information may be obtained, is not limited to the center location in FIG. 13, and may include various locations included in the current coding unit 1300 (e.g., top, bottom, left, right, top left, bottom left, top right, and bottom right locations). The image decoding apparatus 200 may obtain at least one of the block shape information and the split shape information from the predetermined location and determine to split or not to split the current coding unit into various-shaped and various-sized coding units.

According to an embodiment, when the current coding unit is split into a predetermined number of coding units, the image decoding apparatus 200 may select one of the coding units. Various methods may be used to select one of a plurality of coding units, as will be described below in relation to various embodiments.

According to an embodiment, the image decoding apparatus 200 may split the current coding unit into a plurality of coding units, and may determine a coding unit at a predetermined location.

FIG. 13 illustrates a method, performed by the image decoding apparatus 200, of determining a coding unit of a predetermined location from among an odd number of coding units, according to an embodiment.

According to an embodiment, the image decoding apparatus 200 may use information indicating locations of the odd number of coding units, to determine a coding unit at a center location from among the odd number of coding units. Referring to FIG. 13, the image decoding apparatus 200 may determine an odd number of coding units 1320*a*, 1320*b*, and 1320*c* by splitting the current coding unit 1300. The image decoding apparatus 200 may determine a coding unit 1320*b* at a center location by using information about locations of the odd number of coding units 1320*a* to 1320*c*. For example, the image decoding apparatus 200 may determine the coding unit 1320*b* of the center location by determining the locations of the coding units 1320*a*, 1320*b*, and 1320*c* based on information indicating locations of predetermined samples included in the coding units 1320*a*, 1320*b*, and 1320*c*. In detail, the image decoding apparatus 200 may determine the coding unit 1320*b* at the center location by determining the locations of the coding units 1320*a*, 1320*b*, and 1320*c* based on information indicating locations of top left samples 1330*a*, 1330*b*, and 1330*c* of the coding units 1320*a*, 1320*b*, and 1320*c*.

According to an embodiment, the information indicating the locations of the top left samples 1330*a*, 1330*b*, and 1330*c*, which are included in the coding units 1320*a*, 1320*b*, and 1320*c*, respectively, may include information about locations or coordinates of the coding units 1320*a*, 1320*b*, and 1320*c* in a picture. According to an embodiment, the information indicating the locations of the top left samples 1330*a*, 1330*b*, and 1330*c*, which are included in the coding units 1320*a*, 1320*b*, and 1320*c*, respectively, may include information indicating widths or heights of the coding units 1320*a*, 1320*b*, and 1320*c* included in the current coding unit 1300, and the widths or heights may correspond to information indicating differences between the coordinates of the coding units 1320*a*, 1320*b*, and 1320*c* in the picture. That is, the image decoding apparatus 200 may determine the coding unit 1320*b* at the center location by directly using the information about the locations or coordinates of the coding units 1320*a*, 1320*b*, and 1320*c* in the picture, or by using the information about the widths or heights of the coding units, which correspond to the difference values between the coordinates.

According to an embodiment, information indicating the location of the top left sample 1330*a* of the upper coding unit 1320*a* may include coordinates (xa, ya), information indicating the location of the top left sample 1330*b* of the middle coding unit 1320*b* may include coordinates (xb, yb), and information indicating the location of the top left sample 1330*c* of the lower coding unit 1320*c* may include coordinates (xc, yc). The image decoding apparatus 200 may determine the middle coding unit 1320*b* by using the coordinates of the top left samples 1330*a*, 1330*b*, and 1330*c* which are included in the coding units 1320*a*, 1320*b*, and 1320*c*, respectively. For example, when the coordinates of the top left samples 1330*a*, 1330*b*, and 1330*c* are sorted in an ascending or descending order, the coding unit 1320*b* including the coordinates (xb, yb) of the sample 1330*b* at a center location may be determined as a coding unit at a center location from among the coding units 1320*a*, 1320*b*, and 1320*c* determined by splitting the current coding unit 1300. However, the coordinates indicating the locations of the top left samples 1330*a*, 1330*b*, and 1330*c* may include coordinates indicating absolute locations in the picture, or may use coordinates (dxb, dyb) indicating a relative location of the top left sample 1330*b* of the middle coding unit 1320*b* and coordinates (dxc, dyc) indicating a relative location of the top left sample 1330*c* of the lower coding unit 1320*c* with reference to the location of the top left sample 1330*a* of the upper coding unit 1320*a*. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 200 may split the current coding unit 1300 into a plurality of coding units 1320*a*, 1320*b*, and 1320*c*, and may select one of the coding units 1320*a*, 1320*b*, and 1320*c* based on a predetermined criterion. For example, the image decoding apparatus 200 may select the coding unit 1320*b*, which has a size different from that of the others, from among the coding units 1320*a*, 1320*b*, and 1320*c*.

According to an embodiment, the image decoding apparatus 200 may determine the widths or heights of the coding units 1320*a*, 1320*b*, and 1320*c* by using the coordinates (xa, ya) indicating the location of the top left sample 1330*a* of the upper coding unit 1320*a*, the coordinates (xb, yb) indicating the location of the top left sample 1330*b* of the middle coding unit 1320*b*, and the coordinates (xc, yc) indicating the location of the top left sample 1330*c* of the lower coding unit 1320*c*. The image decoding apparatus 200 may determine the respective sizes of the coding units 1320*a*, 1320*b*, and 1320*c* by using the coordinates (xa, ya), (xb, yb), and (xc, yc) indicating the locations of the coding units 1320*a*, 1320*b*, and 1320*c*.

According to an embodiment, the image decoding apparatus 200 may determine the width of the upper coding unit 1320*a* to be xb-xa and determine the height thereof to be yb-ya. According to an embodiment, the image decoding apparatus 200 may determine the width of the middle coding unit 1320*b* to be xc-xb and determine the height thereof to be yc-yb. According to an embodiment, the image decoding apparatus 200 may determine the width or height of the lower coding unit 1320*c* by using the width or height of the current coding unit 1300 or the widths or heights of the upper and middle coding units 1320*a* and 1320*b*. The image decoding apparatus 200 may determine a coding unit, which has a size different from that of the others, based on the determined widths and heights of the coding units 1320*a* to 1320*c*. Referring to FIG. 13, the image decoding apparatus 200 may determine the middle coding unit 1320*b*, which has a size different from the size of the upper and lower coding units 1320*a* and 1320*c*, as the coding unit of the predetermined location. However, the above-described method, performed by the image decoding apparatus 200, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 200 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 200 may determine the coding unit at the predetermined location in a horizontal direction. That is, the image decoding apparatus 200 may determine one of coding units at different locations in a horizontal direction and put a restriction on the coding unit. When the current coding unit has a non-square shape, a height of which is longer than a width, the image decoding apparatus 200 may determine the coding unit at the predetermined location in a vertical direction. That is, the image decoding apparatus 200 may determine one of coding units at different locations in a vertical direction and may put a restriction on the coding unit.

According to an embodiment, the image decoding apparatus 200 may use information indicating respective locations of an even number of coding units, to determine the coding unit at the predetermined location from among the even number of coding units. The image decoding apparatus 200 may determine an even number of coding units by splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 13, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 200 may use at least one of block shape information and split shape information, which is stored in a sample included in a coding unit at a center location, in a splitting operation to determine the coding unit at the center location from among the plurality of coding units determined by splitting the current coding unit.

Referring to FIG. 13, the image decoding apparatus 200 may split the current coding unit 1300 into a plurality of coding units 1320*a*, 1320*b*, and 1320*c* based on at least one of the block shape information and the split shape information, and may determine a coding unit 1320*b* at a center location from among the plurality of the coding units 1320*a*, 1320*b*, and 1320*c*. Furthermore, the image decoding apparatus 200 may determine the coding unit 1320*b* at the center location, in consideration of a location from which at least one of the block shape information and the split shape information is obtained. That is, at least one of the block shape information and the split shape information of the current coding unit 1300 may be obtained from the sample 1340 at a center location of the current coding unit 1300 and, when the current coding unit 1300 is split into the plurality of coding units 1320*a*, 1320*b*, and 1320*c* based on at least one of the block shape information and the split shape information, the coding unit 1320*b* including the sample 1340 may be determined as the coding unit at the center location. However, information used to determine the coding unit at the center location is not limited to at least one of the block shape information and the split shape information, and various types of information may be used to determine the coding unit at the center location.

According to an embodiment, predetermined information for identifying the coding unit at the predetermined location may be obtained from a predetermined sample included in a coding unit to be determined. Referring to FIG. 13, the image decoding apparatus 200 may use at least one of the block shape information and the split shape information, which is obtained from a sample at a predetermined location in the current coding unit 1300 (e.g., a sample at a center location of the current coding unit 1300) to determine a coding unit at a predetermined location from among the plurality of the coding units 1320*a*, 1320*b*, and 1320*c* determined by splitting the current coding unit 1300 (e.g., a coding unit at a center location from among a plurality of split coding units). That is, the image decoding apparatus 200 may determine the sample at the predetermined location by considering a block shape of the current coding unit 1300, determine the coding unit 1320*b* including a sample, from which predetermined information (e.g., at least one of the block shape information and the split shape information) may be obtained, from among the plurality of coding units 1320*a*, 1320*b*, and 1320*c* determined by splitting the current coding unit 1300, and may put a predetermined restriction on the coding unit 1320*b*. Referring to FIG. 13, according to an embodiment, the image decoding apparatus 200 may determine the sample 1340 at the center location of the current coding unit 1300 as the sample from which the predetermined information may be obtained, and may put a predetermined restriction on the coding unit 1320*b* including the sample 1340, in a decoding operation. However, the location of the sample from which the predetermined information may be obtained is not limited to the above-described location, and may include arbitrary locations of samples included in the coding unit 1320*b* to be determined for a restriction.

According to an embodiment, the location of the sample from which the predetermined information may be obtained may be determined based on the shape of the current coding unit 1300. According to an embodiment, the block shape information may indicate whether the current coding unit has a square or non-square shape, and the location of the sample from which the predetermined information may be obtained may be determined based on the shape. For example, the image decoding apparatus 200 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 200 may determine one of samples adjacent to a boundary for dividing a long side of the current coding unit in half, as the sample from which the predetermined information may be obtained.

According to an embodiment, when the current coding unit is split into a plurality of coding units, the image decoding apparatus 200 may use at least one of the block shape information and the split shape information to determine a coding unit at a predetermined location from among the plurality of coding units. According to an embodiment, the image decoding apparatus 200 may obtain at least one of the block shape information and the split shape information from a sample at a predetermined location in a coding unit, and split the plurality of coding units, which are generated by splitting the current coding unit, by using at least one of the split shape information and the block shape information, which is obtained from the sample of the predetermined location in each of the plurality of coding units. That is, a coding unit may be recursively split based on at least one of the block shape information and the split shape information, which is obtained from the sample at the predetermined location in each coding unit. An operation of recursively splitting a coding unit has been described above in relation to FIG. 12, and thus detailed descriptions thereof will not be provided here.

According to an embodiment, the image decoding apparatus 200 may determine one or more coding units by splitting the current coding unit, and may determine an order of decoding the one or more coding units, based on a predetermined block (e.g., the current coding unit).

Figure 14:
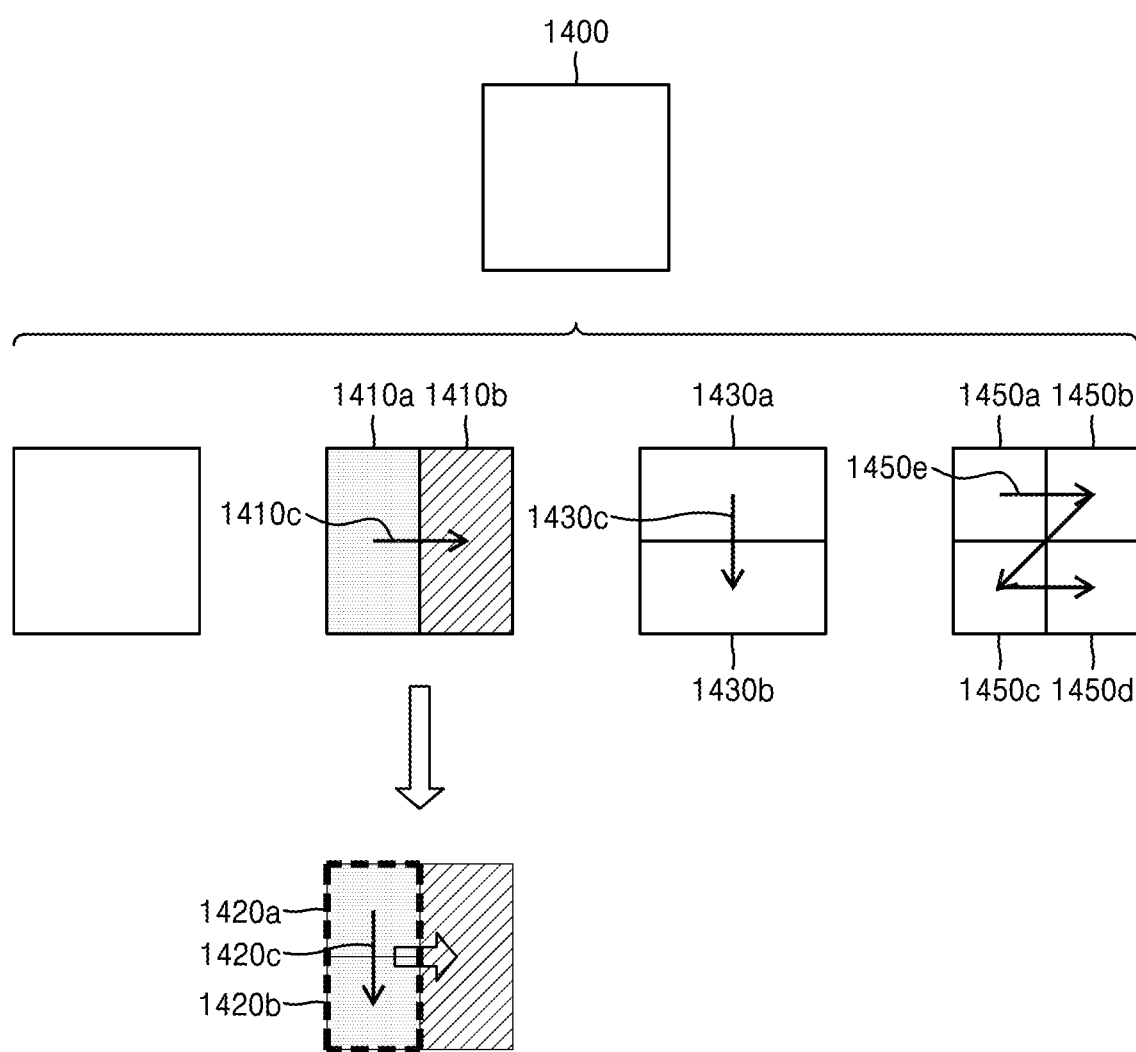
FIG. 14 illustrates an order of processing a plurality of coding units when the plurality of coding units are determined by splitting a current coding unit, according to an embodiment.

FIG. 14 illustrates an order of processing a plurality of coding units when the image decoding apparatus 200 determines the plurality of coding units by splitting a current coding unit, according to an embodiment.

According to an embodiment, the image decoding apparatus 200 may determine second coding units 1410*a* and 1410*b* by splitting a first coding unit 1400 in a vertical direction, determine second coding units 1430*a* and 1430*b* by splitting the first coding unit 1400 in a horizontal direction, or determine second coding units 1450*a* to 1450*d* by splitting the first coding unit 1400 in vertical and horizontal directions, based on block shape information and split shape information.

Referring to FIG. 14, the image decoding apparatus 200 may determine to process the second coding units 1410*a* and 1410*b*, which are determined by splitting the first coding unit 1400 in a vertical direction, in a horizontal direction order 1410*c*. The image decoding apparatus 200 may determine to process the second coding units 1430*a* and 1430*b*, which are determined by splitting the first coding unit 1400 in a horizontal direction, in a vertical direction order 1430*c*. The image decoding apparatus 200 may determine to process the second coding units 1450*a* to 1450*d*, which are determined by splitting the first coding unit 1400 in vertical and horizontal directions, in a predetermined order for processing coding units in a row and then processing coding units in a next row (e.g., in a raster scan order or Z-scan order 1450*e*).

According to an embodiment, the image decoding apparatus 200 may recursively split coding units. Referring to FIG. 14, the image decoding apparatus 200 may determine a plurality of coding units 1410*a*, 1410*b*, 1430*a*, 1430*b*, 1450*a*, 1450*b*, 1450*c*, and 1450*d* by splitting the first coding unit 1400, and may recursively split each of the determined plurality of coding units 1410*a*, 1410*b*, 1430*a*, 1430*b*, 1450*a*, 1450*b*, 1450*c*, and 1450*d*. A splitting method of the plurality of coding units 1410*a*, 1410*b*, 1430*a*, 1430*b*, 1450*a*, 1450*b*, 1450*c*, and 1450*d* may correspond to a splitting method of the first coding unit 1400. As such, each of the plurality of coding units 1410*a*, 1410*b*, 1430*a*, 1430*b*, 1450*a*, 1450*b*, 1450*c*, and 1450*d* may be independently split into a plurality of coding units. Referring to FIG. 14, the image decoding apparatus 200 may determine the second coding units 1410*a* and 1410*b* by splitting the first coding unit 1400 in a vertical direction, and may determine to independently split or not to split each of the second coding units 1410*a* and 1410*b*.

According to an embodiment, the image decoding apparatus 200 may determine third coding units 1420*a* and 1420*b* by splitting the left second coding unit 1410*a* in a horizontal direction, and may not split the right second coding unit 1410*b*.

According to an embodiment, a processing order of coding units may be determined based on an operation of splitting a coding unit. In other words, a processing order of split coding units may be determined based on a processing order of coding units immediately before being split. The image decoding apparatus 200 may determine a processing order of the third coding units 1420*a* and 1420*b* determined by splitting the left second coding unit 1410*a*, independently of the right second coding unit 1410*b*. Because the third coding units 1420*a* and 1420*b* are determined by splitting the left second coding unit 1410*a* in a horizontal direction, the third coding units 1420*a* and 1420*b* may be processed in a vertical direction order 1420*c*. Because the left and right second coding units 1410*a* and 1410*b* are processed in the horizontal direction order 1410*c*, the right second coding unit 1410*b* may be processed after the third coding units 1420*a* and 1420*b* included in the left second coding unit 1410*a* are processed in the vertical direction order 1420*c*. An operation of determining a processing order of coding units based on a coding unit before being split is not limited to the above-described example, and various methods may be used to independently process coding units, which are split and determined to various shapes, in a predetermined order.

Figure 15:
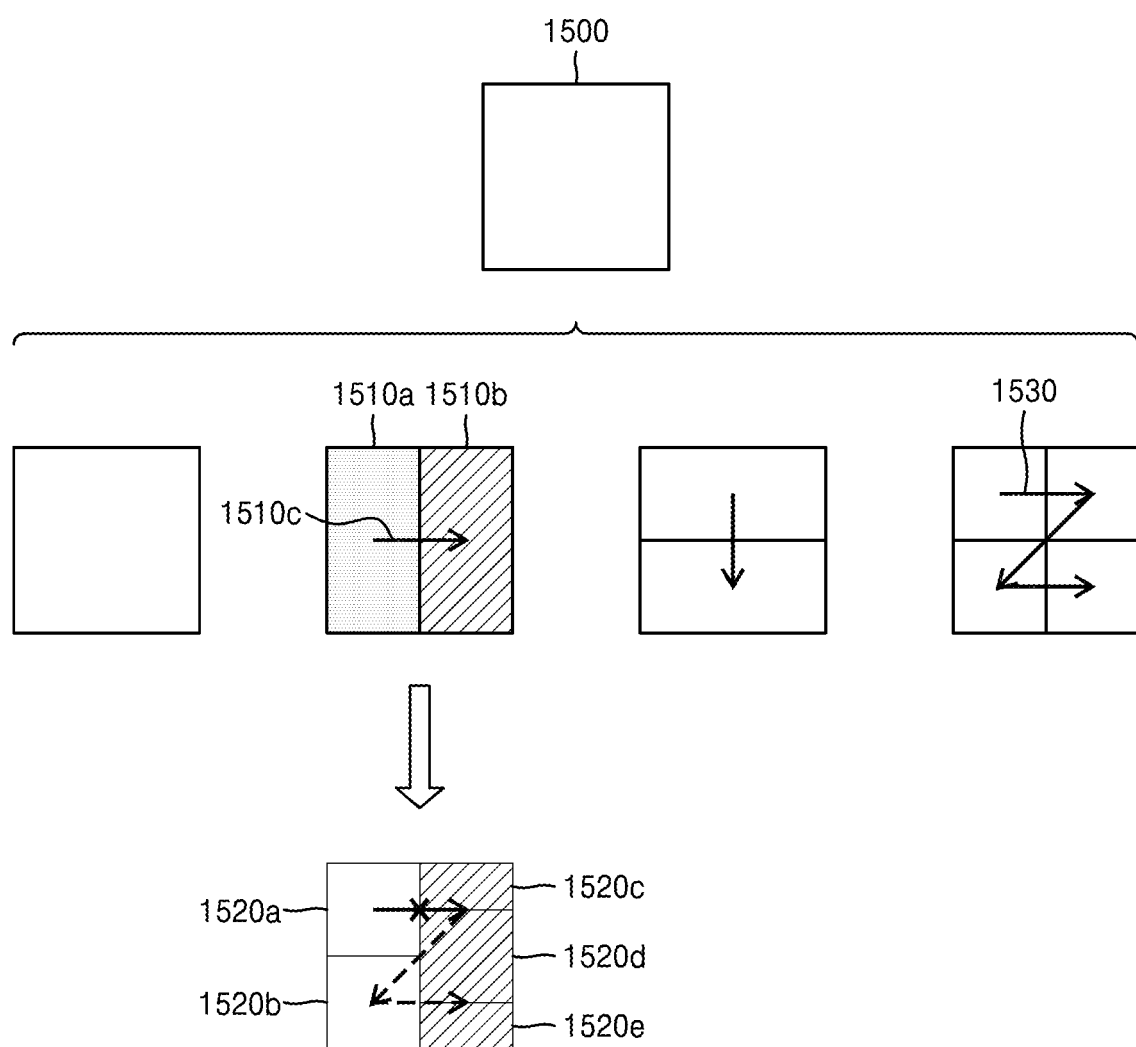
FIG. 15 illustrates a process of determining that a current coding unit is to be split into an odd number of coding units, when the coding units are not processable in a predetermined order, according to an embodiment.

FIG. 15 illustrates a process, performed by the image decoding apparatus 200, of determining that a current coding unit is to be split into an odd number of coding units, when the coding units are not processable in a predetermined order, according to an embodiment.

According to an embodiment, the image decoding apparatus 200 may determine whether the current coding unit is split into an odd number of coding units, based on obtained block shape information and split shape information. Referring to FIG. 15, a square first coding unit 1500 may be split into non-square second coding units 1510a and 1510b, and the second coding units 1510a and 1510b may be independently split into third coding units 1520a and 1520b, and 1520c to 1520e. According to an embodiment, the image decoding apparatus 200 may determine a plurality of third coding units 1520a and 1520b by splitting the left second coding unit 1510a in a horizontal direction, and may split the right second coding unit 1510b into an odd number of third coding units 1520c to 1520e.

According to an embodiment, the image decoding apparatus 200 may determine whether any coding unit is split into an odd number of coding units, by determining whether the third coding units 1520a and 1520b, and 1520c to 1520e are processable in a predetermined order. Referring to FIG. 15, the image decoding apparatus 200 may determine the third coding units 1520a and 1520b, and 1520c to 1520e by recursively splitting the first coding unit 1500. The image decoding apparatus 200 may determine whether any of the first coding unit 1500, the second coding units 1510a and 1510b, and the third coding units 1520a and 1520b, and 1520c, 1520d, and 1520e are split into an odd number of coding units, based on at least one of the block shape information and the split shape information. For example, the right second coding unit 1510b may be split into an odd number of third coding units 1520c, 1520d, and 1520e. A processing order of a plurality of coding units included in the first coding unit 1500 may be a predetermined order (e.g., a Z-scan order 1530), and the image decoding apparatus 200 may decide whether the third coding units 1520c, 1520d, and 1520e, which are determined by splitting the right second coding unit 1510b into an odd number of coding units, satisfy a condition for processing in the predetermined order.

According to an embodiment, the image decoding apparatus 200 may determine whether the third coding units 1520a and 1520b, and 1520c, 1520d, and 1520e included in the first coding unit 1500 satisfy the condition for processing in the predetermined order, and the condition relates to whether at least one of a width and height of the second coding units 1510a and 1510b is divided in half along a boundary of the third coding units 1520a and 1520b, and 1520c, 1520d, and 1520e. For example, the third coding units 1520a and 1520b determined by dividing the height of the non-square left second coding unit 1510a in half satisfy the condition. However, because boundaries of the third coding units 1520c, 1520d, and 1520e determined by splitting the right second coding unit 1510b into three coding units do not divide the width or height of the right second coding unit 1510b in half, it may be determined that the third coding units 1520c, 1520d, and 1520e do not satisfy the condition. When the condition is not satisfied as described above, the image decoding apparatus 200 may decide disconnection of a scan order, and determine that the right second coding unit 1510b is split into an odd number of coding units, based on a result of the decision. According to an embodiment, when a coding unit is split into an odd number of coding units, the image decoding apparatus 200 may put a predetermined restriction on a coding unit at a predetermined location from among the split coding units. The restriction or the predetermined location has been described above in relation to various embodiments, and thus detailed descriptions thereof will not be provided herein.

Figure 16:
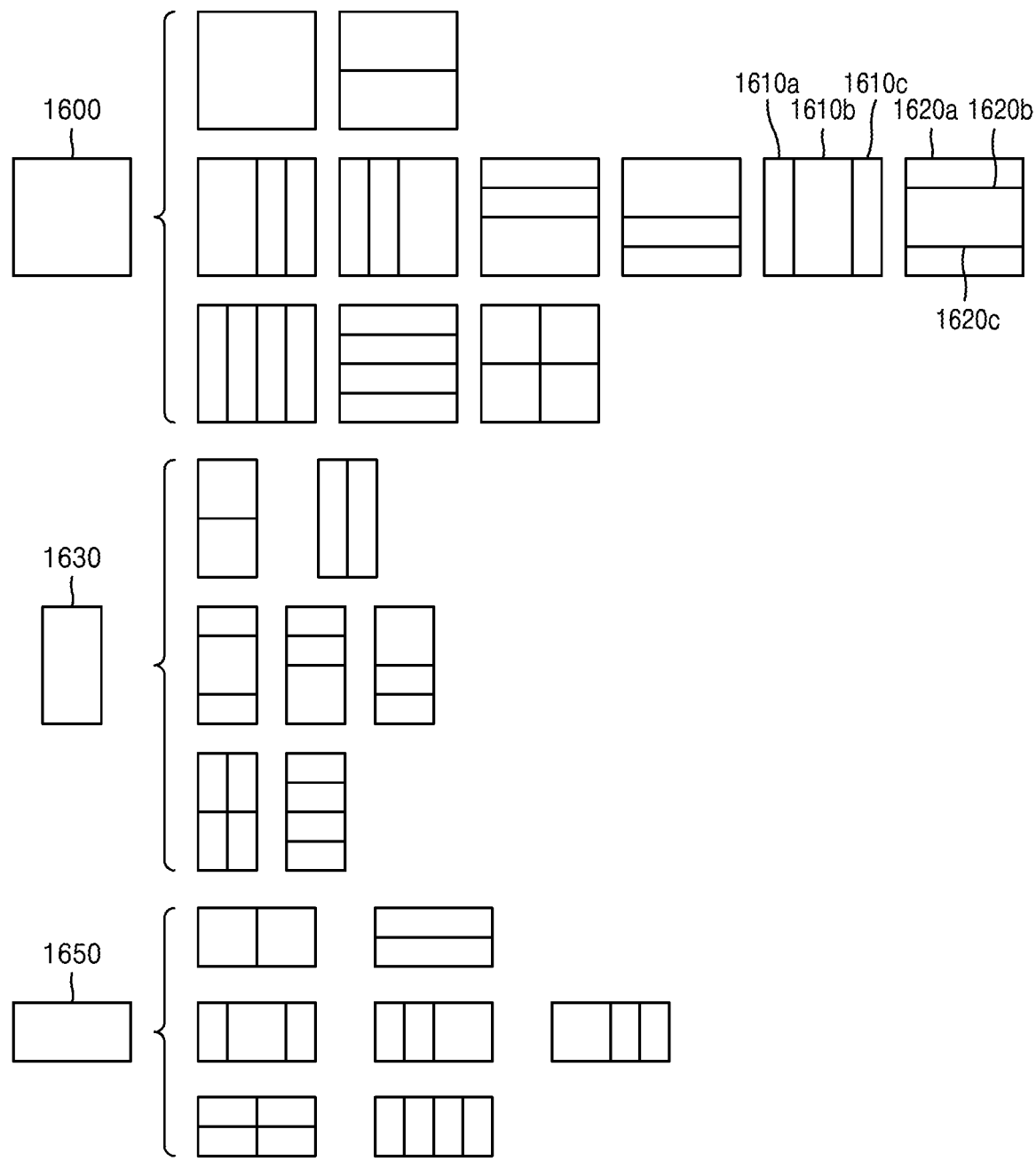
FIG. 16 illustrates a process of determining at least one coding unit by splitting a first coding unit, according to an embodiment.

FIG. 16 illustrates a process, performed by the image decoding apparatus 200, of determining at least one coding unit by splitting a first coding unit 1600, according to an embodiment. According to an embodiment, the image decoding apparatus 200 may split the first coding unit 1600, based on at least one of block shape information and split shape information, which is obtained by a receiver 210. The square first coding unit 1600 may be split into four square coding units, or may be split into a plurality of non-square coding units. For example, referring to FIG. 16, when the block shape information indicates that the first coding unit 1600 has a square shape and the split shape information indicates to split the first coding unit 1600 into non-square coding units, the image decoding apparatus 200 may split the first coding unit 1600 into a plurality of non-square coding units. In detail, when the split shape information indicates to determine an odd number of coding units by splitting the first coding unit 1600 in a horizontal direction or a vertical direction, the image decoding apparatus 200 may split the square first coding unit 1600 into an odd number of coding units, e.g., second coding units 1610a, 1610b, and 1610c determined by splitting the square first coding unit 1600 in a vertical direction or second coding units 1620a, 1620b, and 1620c determined by splitting the square first coding unit 1600 in a horizontal direction.

According to an embodiment, the image decoding apparatus 200 may determine whether the second coding units 1610a, 1610b, 1610c, 1620a, 1620b, and 1620c included in the first coding unit 1600 satisfy a condition for processing in a predetermined order, and the condition relates to whether at least one of a width and height of the first coding unit 1600 is divided in half along a boundary of the second coding units 1610a, 1610b, 1610c, 1620a, 1620b, and 1620c. Referring to FIG. 16, because boundaries of the second coding units 1610a, 1610b, and 1610c determined by splitting the square first coding unit 1600 in a vertical direction do not divide the height of the first coding unit 1600 in half, it may be determined that the first coding unit 1600 does not satisfy the condition for processing in the predetermined order. In addition, because boundaries of the second coding units 1620a, 1620b, and 1620c determined by splitting the square first coding unit 1600 in a horizontal direction do not divide the width of the first coding unit 1600 in half, it may be determined that the first coding unit 1600 does not satisfy the condition for processing in the predetermined order. When the condition is not satisfied as described above, the image decoding apparatus 200 may decide disconnection of a scan order, and may determine that the first coding unit 1600 is split into an odd number of coding units, based on a result of the decision. According to an embodiment, when a coding unit is split into an odd number of coding units, the image decoding apparatus 200 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 200 may determine various-shaped coding units by splitting a first coding unit.

Referring to FIG. 16, the image decoding apparatus 200 may split the square first coding unit 1600 or a non-square first coding unit 1630 or 1650 into various-shaped coding units.

Figure 17:
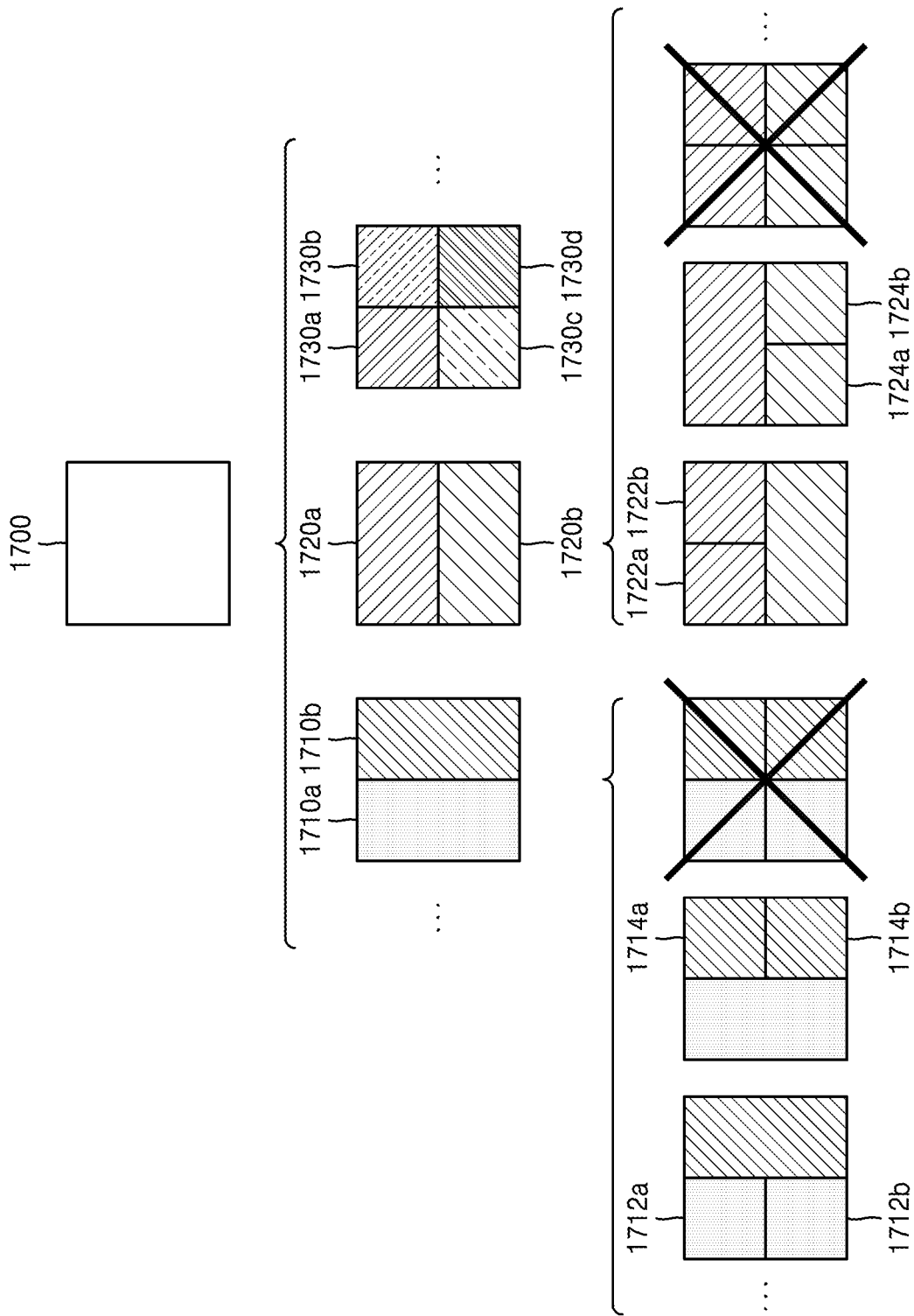
FIG. 17 illustrates that a shape into which a second coding unit is splittable is restricted when the second coding unit having a non-square shape, which is determined by splitting a first coding unit, satisfies a predetermined condition, according to an embodiment.

FIG. 17 illustrates that a shape into which a second coding unit is splittable by the image decoding apparatus 200 is restricted when the second coding unit having a non-square shape, which is determined by splitting a first coding unit 1700, satisfies a predetermined condition, according to an embodiment.

According to an embodiment, the image decoding apparatus 200 may determine to split the square first coding unit 1700 into non-square second coding units 1710a, 1710b, 1720a, and 1720b, based on at least one of block shape information and split shape information, which is obtained by the receiver 210. The second coding units 1710a, 1710b, 1720a, and 1720b may be independently split. As such, the image decoding apparatus 200 may determine to split or not to split the first coding unit 1700 into a plurality of coding units, based on at least one of the block shape information and the split shape information of each of the second coding units 1710a, 1710b, 1720a, and 1720b. According to an embodiment, the image decoding apparatus 200 may determine third coding units 1712a and 1712b by splitting the non-square left second coding unit 1710a, which is determined by splitting the first coding unit 1700 in a vertical direction, in a horizontal direction. However, when the left second coding unit 1710a is split in a horizontal direction, the image decoding apparatus 200 may restrict the right second coding unit 1710b to not be split in a horizontal direction in which the left second coding unit 1710a is split. When third coding units 1714a and 1714b are determined by splitting the right second coding unit 1710b in a same direction, because the left and right second coding units 1710a and 1710b are independently split in a horizontal direction, the third coding units 1712a, 1712b, 1714a, and 1714b may be determined. However, this case serves equally as a case in which the image decoding apparatus 200 splits the first coding unit 1700 into four square second coding units 1730a, 1730b, 1730c, and 1730d, based on at least one of the block shape information and the split shape information, and may be inefficient in terms of image decoding.

According to an embodiment, the image decoding apparatus 200 may determine third coding units 1722a, 1722b, 1724a, and 1724b by splitting the non-square second coding unit 1720a or 1720b, which is determined by splitting a first coding unit 11300 in a horizontal direction, in a vertical direction. However, when a second coding unit (e.g., the upper second coding unit 1720a) is split in a vertical direction, for the above-described reason, the image decoding apparatus 200 may restrict the other second coding unit (e.g., the lower second coding unit 1720b) to not be split in a vertical direction in which the upper second coding unit 1720a is split.

Figure 18:
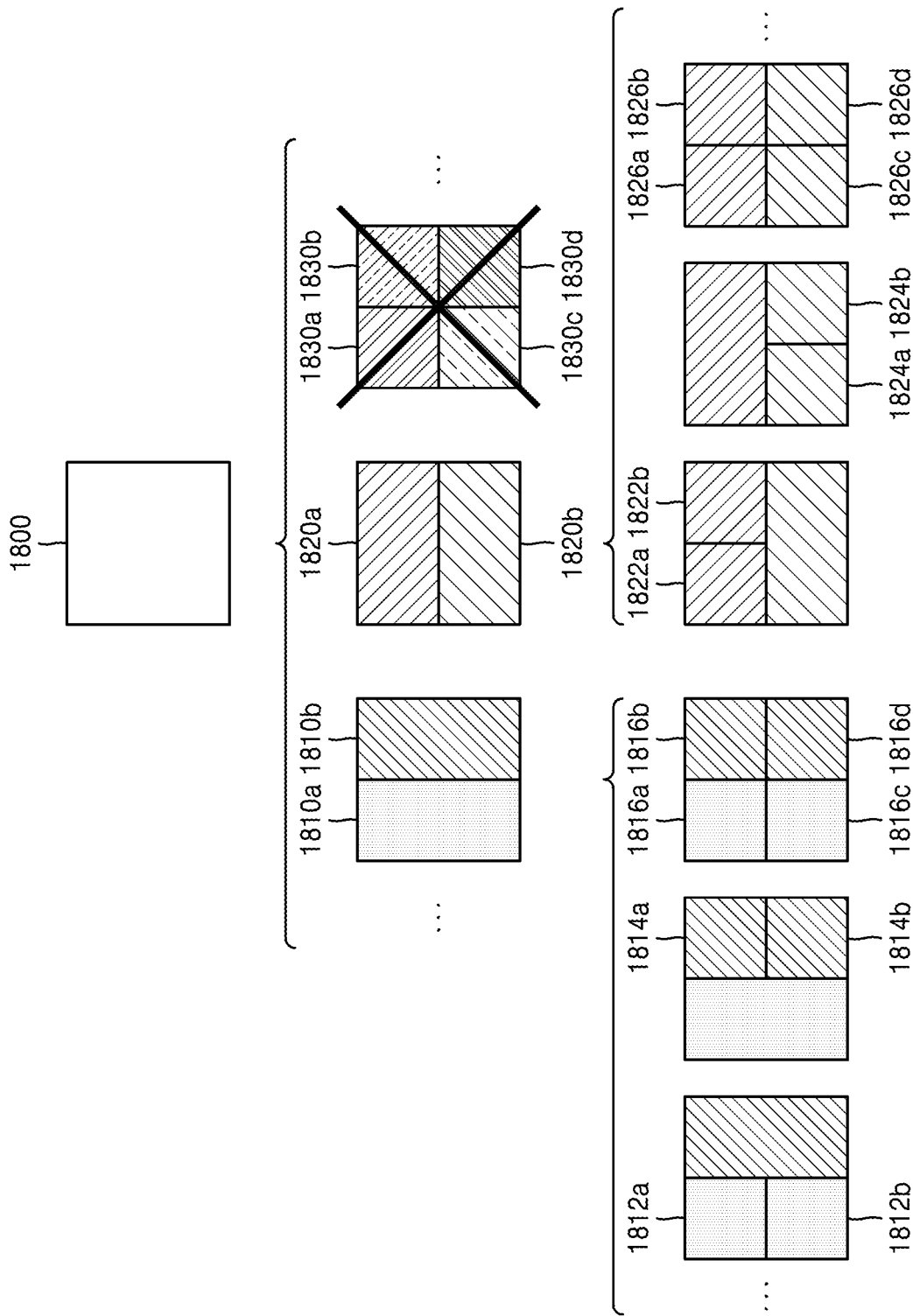
FIG. 18 illustrates a process of splitting a square coding unit when split shape information indicates that the square coding unit is not to be split into four square coding units, according to an embodiment.

FIG. 18 illustrates a process, performed by the image decoding apparatus 200, of splitting a square coding unit when split shape information indicates that the square coding unit is not to be split into four square coding units, according to an embodiment.

According to an embodiment, the image decoding apparatus 200 may determine second coding units 1810a, 1810b, 1820a, 1820b, etc. by splitting a first coding unit 1800, based on at least one of block shape information and split shape information. The split shape information may include information about various methods of splitting a coding unit but, the information about various splitting methods may not include information for splitting a coding unit into four square coding units. According to such split shape information, the image decoding apparatus 200 may not split the first square coding unit 1800 into four square second coding units 1830a, 1830b, 1830c, and 1830d. The image decoding apparatus 200 may determine the non-square second coding units 1810a, 1810b, 1820a, 1820b, etc., based on the split shape information.

According to an embodiment, the image decoding apparatus 200 may independently split the non-square second coding units 1810a, 1810b, 1820a, 1820b, etc. Each of the second coding units 1810a, 1810b, 1820a, 1820b, etc. may be recursively split in a predetermined order, and this splitting method may correspond to a method of splitting the first coding unit 1800, based on at least one of the block shape information and the split shape information.

For example, the image decoding apparatus 200 may determine square third coding units 1812a and 1812b by splitting the left second coding unit 1810a in a horizontal direction, and may determine square third coding units 1814a and 1814b by splitting the right second coding unit 1810b in a horizontal direction. Furthermore, the image decoding apparatus 200 may determine square third coding units 1816a, 1816b, 1816c, and 1816d by splitting both of the left and right second coding units 1810a and 1810b in a horizontal direction. In this case, coding units having the same shape as the four square second coding units 1830a, 1830b, 1830c, and 1830d split from the first coding unit 1800 may be determined.

As another example, the image decoding apparatus 200 may determine square third coding units 1822a and 1822b by splitting the upper second coding unit 1820a in a vertical direction, and may determine square third coding units 1824a and 1824b by splitting the lower second coding unit 1820b in a vertical direction. Furthermore, the image decoding apparatus 200 may determine square third coding units 1822a, 1822b, 1824a, and 1824b by splitting both of the upper and lower second coding units 1820a and 1820b in a vertical direction. In this case, coding units having the same shape as the four square second coding units 1830a, 1830b, 1830c, and 1830d split from the first coding unit 1800 may be determined.

Figure 19:
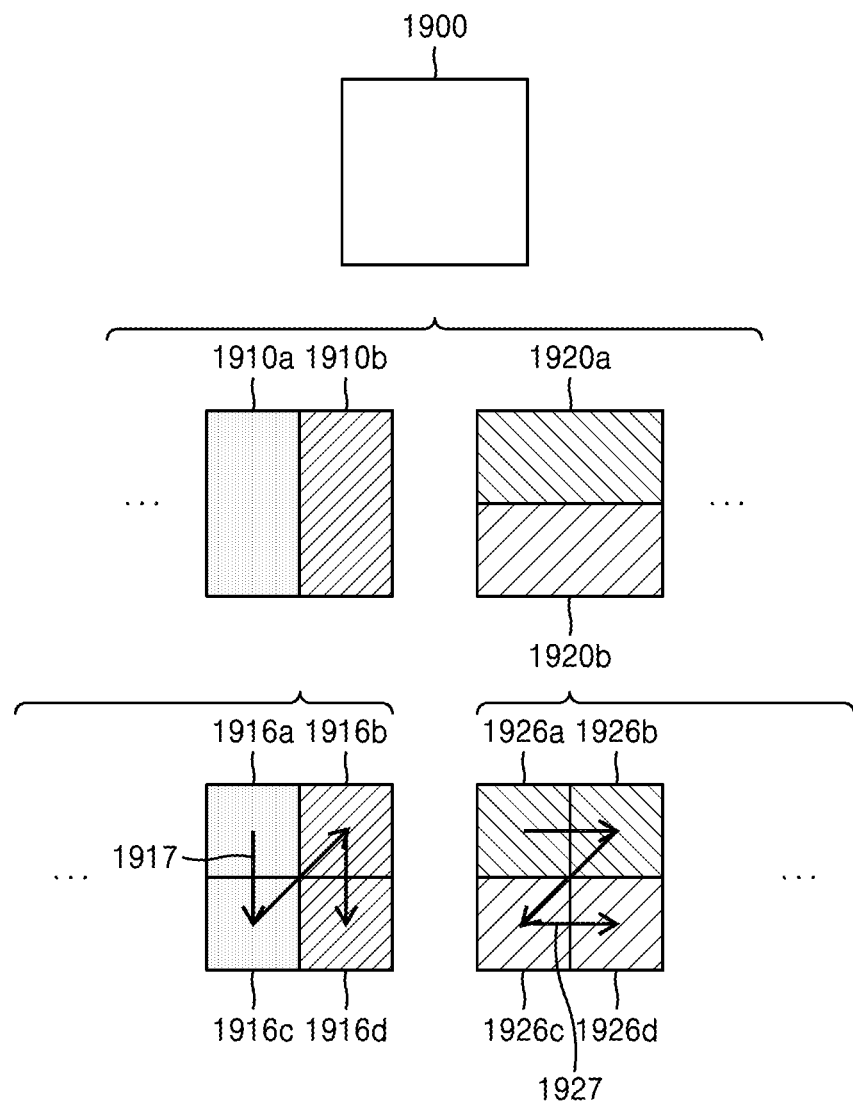
FIG. 19 illustrates that a processing order between a plurality of coding units may be changed depending on a process of splitting a coding unit, according to an embodiment.

FIG. 19 illustrates that a processing order between a plurality of coding units may be changed depending on a process of splitting a coding unit, according to an embodiment.

According to an embodiment, the image decoding apparatus 200 may split a first coding unit 1900, based on block shape information and split shape information. When the block shape information indicates a square shape and the split shape information indicates to split the first coding unit 1900 in at least one of horizontal and vertical directions, the image decoding apparatus 200 may determine second coding units 1910a, 1910b, 1920a, 1920b, 1930a, 1930b, 1930c, and 1930d by splitting the first coding unit 1900. Referring to FIG. 19, the non-square second coding units 1910a, 1910b, 1920a, and 1920b determined by splitting the first coding unit 1900 in only a horizontal direction or vertical direction may be independently split based on the block shape information and the split shape information of each coding unit. For example, the image decoding apparatus 200 may determine third coding units 1916a, 1916b, 1916c, and 1916d by splitting the second coding units 1910a and 1910b, which are generated by splitting the first coding unit 1900 in a vertical direction, in a horizontal direction, and may determine third coding units 1926*a*, 1926*b*, 1926*c*, and 1926*d* by splitting the second coding units 1920*a* and 1920*b*, which are generated by splitting the first coding unit 1900 in a horizontal direction, in a vertical direction. An operation of splitting the second coding units 1910*a*, 1910*b*, 1920*a*, and 1920*b* has been described above in relation to FIG. 17, and thus detailed descriptions thereof will not be provided herein.

According to an embodiment, the image decoding apparatus 200 may process coding units in a predetermined order. An operation of processing coding units in a predetermined order has been described above in relation to FIG. 14, and thus detailed descriptions thereof will not be provided herein. Referring to FIG. 19, the image decoding apparatus 200 may determine four square third coding units 1916*a*, 1916*b*, 1916*c*, and 1916*d*, and 1926*a*, 1926*b*, 1926*c*, and 1926*d* by splitting the square first coding unit 1900. According to an embodiment, the image decoding apparatus 200 may determine processing orders of the third coding units 1916*a*, 1916*b*, 1916*c*, and 1916*d*, and 1926*a*, 1926*b*, 1926*c*, and 1926*d* based on a splitting method of the first coding unit 1900.

According to an embodiment, the image decoding apparatus 200 may determine the third coding units 1916*a*, 1916*b*, 1916*c*, and 1916*d* by splitting the second coding units 1910*a* and 1910*b* generated by splitting the first coding unit 1900 in a vertical direction, in a horizontal direction, and may process the third coding units 1916*a*, 1916*b*, 1916*c*, and 1916*d* in a processing order 1917 for initially processing the third coding units 1916*a* and 1916*b*, which are included in the left second coding unit 1910*a*, in a vertical direction and then processing the third coding unit 1916*c* and 1916*d*, which are included in the right second coding unit 1910*b*, in a vertical direction.

According to an embodiment, the image decoding apparatus 200 may determine the third coding units 1926*a*, 1926*b*, 1926*c*, and 1926*d* by splitting the second coding units 1920*a* and 1920*b* generated by splitting the first coding unit 1900 in a horizontal direction, in a vertical direction, and may process the third coding units 1926*a*, 1926*b*, 1926*c*, and 1926*d* in a processing order 1927 for initially processing the third coding units 1926*a* and 1926*b*, which are included in the upper second coding unit 1920*a*, in a horizontal direction and then processing the third coding unit 1926*c* and 1926*d*, which are included in the lower second coding unit 1920*b*, in a horizontal direction.

Referring to FIG. 19, the square third coding units 1916*a*, 1916*b*, 1916*c*, and 1916*d*, and 1926*a*, 1926*b*, 1926*c*, and 1926*d* may be determined by splitting the second coding units 1910*a*, 1910*b*, 1920*a*, and 1920*b*, respectively. Although the second coding units 1910*a* and 1910*b* are determined by splitting the first coding unit 1900 in a vertical direction differently from the second coding units 1920*a* and 1920*b* which are determined by splitting the first coding unit 1900 in a horizontal direction, the third coding units 1916*a*, 1916*b*, 1916*c*, and 1916*d*, and 1926*a*, 1926*b*, 1926*c*, and 1926*d* split therefrom eventually show same-shaped coding units split from the first coding unit 1900. As such, by recursively splitting a coding unit in different manners based on at least one of the block shape information and the split shape information, the image decoding apparatus 200 may process a plurality of coding units in different orders even when the coding units are eventually determined to be the same shape.

FIG. 20 illustrates a process of determining a depth of a coding unit as a shape and size of the coding unit change, when the coding unit is recursively split such that a plurality of coding units are determined, according to an embodiment.

According to an embodiment, the image decoding apparatus 200 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 200 may determine that a depth of the current coding unit is increased from a depth of the coding unit before being split, by n. In the following description, a coding unit having an increased depth is expressed as a coding unit of a deeper depth.

Referring to FIG. 20, according to an embodiment, the image decoding apparatus 200 may determine a second coding unit 2002 and a third coding unit 2004 of deeper depths by splitting a square first coding unit 2000 based on block shape information indicating a square shape (for example, the block shape information may be expressed as '0: SQUARE'). Assuming that the size of the square first coding unit 2000 is 2N×2N, the second coding unit 2002 determined by dividing a width and height of the first coding unit 2000 to $½^1$ may have a size of N×N. Furthermore, the third coding unit 2004 determined by dividing a width and height of the second coding unit 2002 to ½ may have a size of N/2×N/2. In this case, a width and height of the third coding unit 2004 are $½_2$ times those of the first coding unit 2000. When a depth of the first coding unit 2000 is D, a depth of the second coding unit 2002, the width and height of which are $½_1$ times those of the first coding unit 2000, may be D+1, and a depth of the third coding unit 2004, the width and height of which are $½_2$ times those of the first coding unit 2000, may be D+2.

According to an embodiment, the image decoding apparatus 200 may determine a second coding unit 2012 or 2022 and a third coding unit 2014 or 2024 of deeper depths by splitting a non-square first coding unit 2010 or 2020 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 200 may determine a second coding unit 2002, 2012, or 2022 by dividing at least one of a width and height of the first coding unit 2010 having a size of N×2N. That is, the image decoding apparatus 200 may determine the second coding unit 2002 having a size of N×N or the second coding unit 2022 having a size of N×N/2 by splitting the first coding unit 2010 in a horizontal direction, or may determine the second coding unit 2012 having a size of N/2×N by splitting the first coding unit 2010 in horizontal and vertical directions.

According to an embodiment, the image decoding apparatus 200 may determine the second coding unit 2002, 2012, or 2022 by dividing at least one of a width and height of the first coding unit 2020 having a size of 2N×N. That is, the image decoding apparatus 200 may determine the second coding unit 2002 having a size of N×N or the second coding unit 2012 having a size of N/2×N by splitting the first coding unit 2020 in a vertical direction, or may determine the second coding unit 2022 having a size of N×N/2 by splitting the first coding unit 2020 in horizontal and vertical directions.

According to an embodiment, the image decoding apparatus 200 may determine a third coding unit 2004, 2014, or 2024 by dividing at least one of a width and height of the second coding unit 2002 having a size of N×N. That is, the image decoding apparatus 200 may determine the third coding unit 2004 having a size of N/2×N/2, the third coding unit 2014 having a size of N/22×N/2, or the third coding unit 2024 having a size of N/2×N/22 by splitting the second coding unit 2002 in vertical and horizontal directions.

According to an embodiment, the image decoding apparatus 200 may determine the third coding unit 2004, 2014, or 2024 by dividing at least one of a width and height of the second coding unit 2012 having a size of N/2×N. That is, the image decoding apparatus 200 may determine the third coding unit 2004 having a size of N/2×N/2 or the third coding unit 2024 having a size of N/2×N/22 by splitting the second coding unit 2012 in a horizontal direction, or may determine the third coding unit 2014 having a size of N/22×N/2 by splitting the second coding unit 2012 in vertical and horizontal directions.

According to an embodiment, the image decoding apparatus 200 may determine the third coding unit 2004, 2014, or 2024 by dividing at least one of a width and height of the second coding unit 2014 (2022 ?) having a size of N×N/2. That is, the image decoding apparatus 200 may determine the third coding unit 2004 having a size of N/2×N/2 or the third coding unit 2014 having a size of N/22×N/2 by splitting the second coding unit 2012 in a vertical direction, or may determine the third coding unit 2024 having a size of N/2×N/22 by splitting the second coding unit 2022 in vertical and horizontal directions.

According to an embodiment, the image decoding apparatus 200 may split the square coding unit 2000, 2002, or 2004 in a horizontal or vertical direction. For example, the image decoding apparatus 200 may determine the first coding unit 2010 having a size of N×2N by splitting the first coding unit 2000 having a size of 2N×2N in a vertical direction, or may determine the first coding unit 2020 having a size of 2N×N by splitting the first coding unit 2000 in a horizontal direction. According to an embodiment, when a depth is determined based on the length of the longest side of a coding unit, a depth of a coding unit determined by splitting the first coding unit 2000, 2002 or 2004 having a size of 2N×2N in a horizontal or vertical direction may be the same as the depth of the first coding unit 2000, 2002 or 2004.

According to an embodiment, a width and height of the third coding unit 2014 or 2024 may be ½₂ times those of the first coding unit 2010 or 2020. When a depth of the first coding unit 2010 or 2020 is D, a depth of the second coding unit 2012 or 2014, the width and height of which are ½ times those of the first coding unit 2010 or 2020, may be D+1, and a depth of the third coding unit 2014 or 2024, the width and height of which are ½₂ times those of the first coding unit 2010 or 2020, may be D+2.

Figure 21:
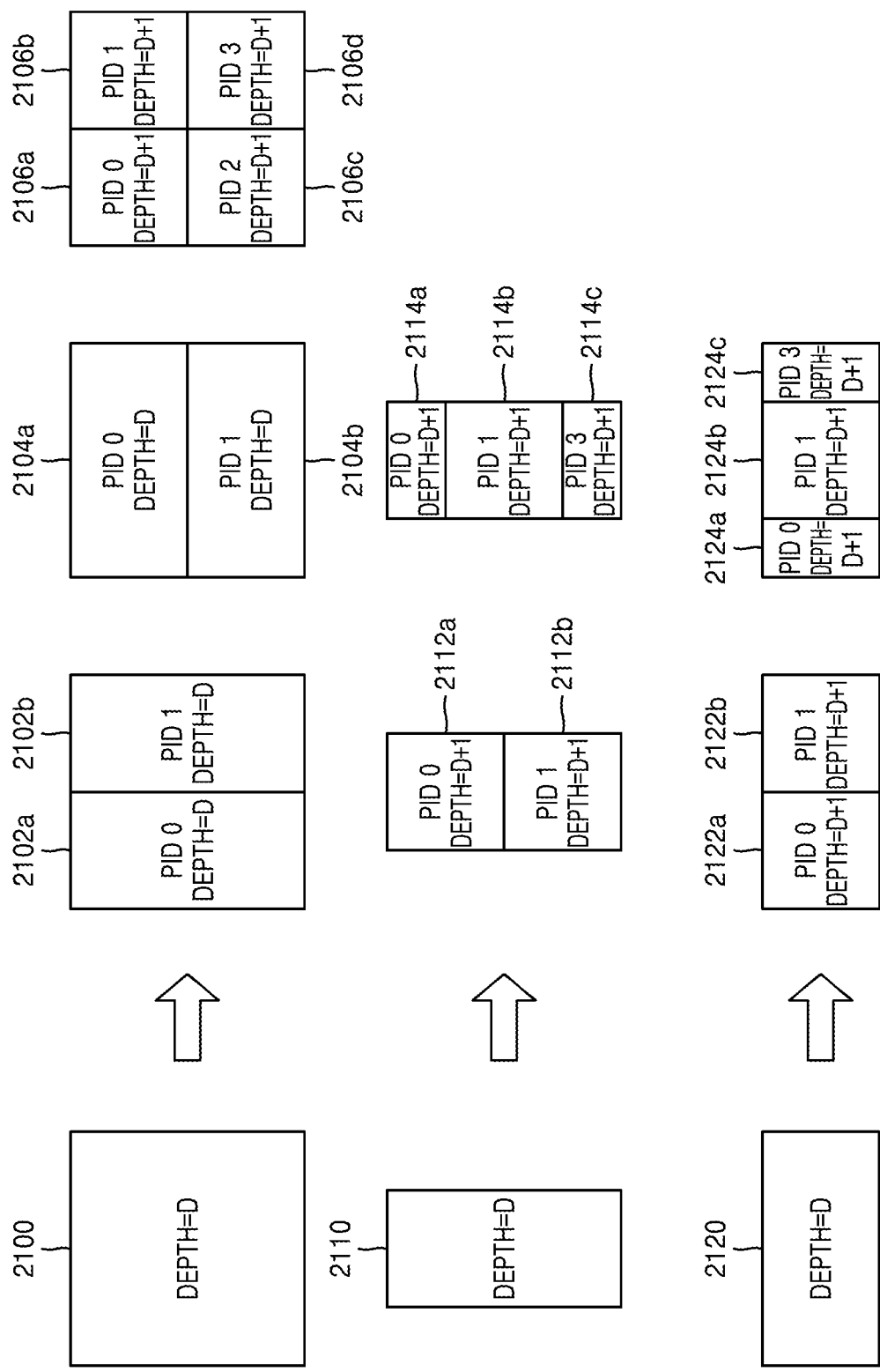
FIG. 21 illustrates depths that are determinable based on shapes and sizes of coding units, and part indexes (PIDs) that are for distinguishing the coding units, according to an embodiment.

FIG. 21 illustrates depths that are determinable based on shapes and sizes of coding units, and part indexes (PIDs) that are for distinguishing the coding units, according to an embodiment.

According to an embodiment, the image decoding apparatus 200 may determine various-shape second coding units by splitting a square first coding unit 2100. Referring to FIG. 21, the image decoding apparatus 200 may determine second coding units 2102a and 2102b, 2104a and 2104b, and 2106a, 2106b, 2106c, and 2106d by splitting the first coding unit 2100 in at least one of vertical and horizontal directions based on split shape information. That is, the image decoding apparatus 200 may determine the second coding units 2102a and 2102b, 2104a and 2104b, and 2106a, 2106b, 2106c, and 2106d, based on the split shape information of the first coding unit 2100.

According to an embodiment, a depth of the second coding units 2102a and 2102b, 2104a and 2104b, and 2106a, 2106b, 2106c, and 2106d, which are determined based on the split shape information of the square first coding unit 2100, may be determined based on the length of a long side thereof. For example, because the length of a side of the square first coding unit 2100 equals the length of a long side of the non-square second coding units 2102a and 2102b, and 2104a and 2104b, the first coding unit 2100 and the non-square second coding units 2102a and 2102b, and 2104a and 2104b may have the same depth, e.g., D. However, when the image decoding apparatus 200 splits the first coding unit 2100 into the four square second coding units 2106a, 2106b, 2106c, and 2106d based on the split shape information, because the length of a side of the square second coding units 2106a, 2106b, 2106c, and 2106d is ½ times the length of a side of the first coding unit 2100, a depth of the second coding units 2106a, 2106b, 2106c, and 2106d may be D+1 which is deeper than the depth D of the first coding unit 2100 by 1.

According to an embodiment, the image decoding apparatus 200 may determine a plurality of second coding units 2112a and 2112b, and 2114a, 2114b, and 2114c by splitting a first coding unit 2110, a height of which is longer than a width, in a horizontal direction based on the split shape information. According to an embodiment, the image decoding apparatus 200 may determine a plurality of second coding units 2122a and 2122b, and 2124a, 2124b, and 2124c by splitting a first coding unit 2120, a width of which is longer than a height, in a vertical direction based on the split shape information.

According to an embodiment, a depth of the second coding units 2112a and 2112b, 2114a, 2114b, and 2116a, 2116b, 2116c, and 2116d, which are determined based on the split shape information of the non-square first coding unit 2110 or 2120, may be determined based on the length of a long side thereof. For example, because the length of a side of the square second coding units 2112a and 2112b is ½ times the length of a long side of the first coding unit 2110 having a non-square shape, a height of which is longer than a width, a depth of the square second coding units 2102a, 2102b, 2104a, and 2104b is D+1 which is deeper than the depth D of the non-square first coding unit 2110 by 1.

Furthermore, the image decoding apparatus 200 may split the non-square first coding unit 2110 into an odd number of second coding units 2114a, 2114b, and 2114c based on the split shape information. The odd number of second coding units 2114a, 2114b, and 2114c may include the non-square second coding units 2114a and 2114c and the square second coding unit 2114b. In this case, because the length of a long side of the non-square second coding units 2114a and 2114c and the length of a side of the square second coding unit 2114b are ½ times the length of a long side of the first coding unit 2110, a depth of the second coding units 2114a, 2114b, and 2114c may be D+1 which is deeper than the depth D of the non-square first coding unit 2110 by 1. The image decoding apparatus 200 may determine depths of coding units split from the first coding unit 2120 having a non-square shape, a width of which is longer than a height, by using the above-described method of determining depths of coding units split from the first coding unit 2110.

According to an embodiment, the image decoding apparatus 200 may determine PIDs for identifying split coding units, based on a size ratio between the coding units when an odd number of split coding units do not have equal sizes. Referring to FIG. 21, a coding unit 2114b of a center location among an odd number of split coding units 2114a, 2114b, and 2114c may have a width equal to that of the other coding units 2114a and 2114c and a height which is two times that of the other coding units 2114a and 2114c. That is, in this case, the coding unit 2114b at the center location may include two of the other coding unit 2114a or 2114c. Therefore, when a PID of the coding unit 2114b at the center location is 1 based on a scan order, a PID of the coding unit 2114c located next to the coding unit 2114b may be increased by 2 and thus may be 3. That is, discontinuity in PID values may be present. According to an embodiment, the image decoding apparatus 200 may determine whether an odd number of split coding units do not have equal sizes, based on whether discontinuity is present in PIDs for identifying the split coding units.

(Tri-Split is Determined by Using PID)

According to an embodiment, the image decoding apparatus 200 may determine whether to use a specific splitting method, based on PID values for identifying a plurality of coding units determined by splitting a current coding unit. Referring to FIG. 21, the image decoding apparatus 200 may determine an even number of coding units 2112a and 2112b or an odd number of coding units 2114a, 2114b, and 2114c by splitting the first coding unit 2110 having a rectangular shape, a height of which is longer than a width. The image decoding apparatus 200 may use PIDs to identify respective coding units. According to an embodiment, the PID may be obtained from a sample of a predetermined location of each coding unit (e.g., a top left sample).

According to an embodiment, the image decoding apparatus 200 may determine a coding unit at a predetermined location from among the split coding units, by using the PIDs for distinguishing the coding units. According to an embodiment, when the split shape information of the first coding unit 2110 having a rectangular shape, a height of which is longer than a width, indicates to split a coding unit into three coding units, the image decoding apparatus 200 may split the first coding unit 2110 into three coding units 2114a, 2114b, and 2114c. The image decoding apparatus 200 may assign a PID to each of the three coding units 2114a, 2114b, and 2114c. The image decoding apparatus 200 may compare PIDs of an odd number of split coding units to determine a coding unit at a center location from among the coding units. The image decoding apparatus 200 may determine the coding unit 2114b having a PID corresponding to a middle value among the PIDs of the coding units, as the coding unit at the center location from among the coding units determined by splitting the first coding unit 2110. According to an embodiment, the image decoding apparatus 200 may determine PIDs for distinguishing split coding units, based on a size ratio between the coding units when the split coding units do not have equal sizes. Referring to FIG. 21, the coding unit 2114b generated by splitting the first coding unit 2110 may have a width equal to that of the other coding units 2114a and 2114c and a height which is two times that of the other coding units 2114a and 2114c. In this case, when the PID of the coding unit 2114b at the center location is 1, the PID of the coding unit 2114c located next to the coding unit 2114b may be increased by 2 and thus may be 3. When the PID is not uniformly increased as described above, the image decoding apparatus 200 may determine that a coding unit is split into a plurality of coding units including a coding unit having a size different from that of the other coding units. According to an embodiment, when the split shape information indicates to split a coding unit into an odd number of coding units, the image decoding apparatus 200 may split a current coding unit in such a manner that a coding unit of a predetermined location among an odd number of coding units (e.g., a coding unit of a centre location) has a size different from that of the other coding units. In this case, the image decoding apparatus 200 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 200 may use a predetermined data unit where a coding unit starts to be recursively split.

Figure 22:
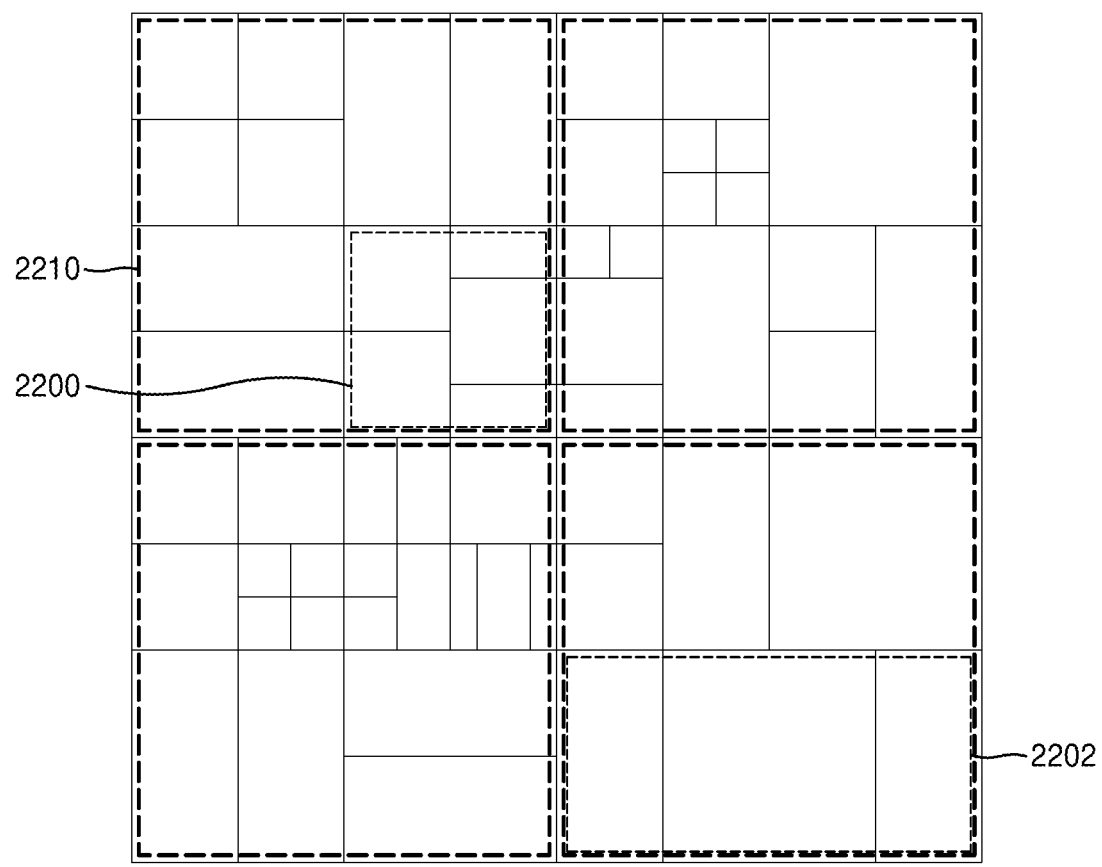
FIG. 22 illustrates that a plurality of coding units are determined based on a plurality of predetermined data units included in a picture, according to an embodiment.

FIG. 22 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as multipliers of 2. That is, the reference data unit may have a square or non-square shape, and may be split into an integer number of coding units.

According to an embodiment, the image decoding apparatus 200 may split the current picture into a plurality of reference data units. According to an embodiment, the image decoding apparatus 200 may split the plurality of reference data units, which are split from the current picture, by using splitting information about each reference data unit. The operation of splitting the reference data unit may correspond to a splitting operation using a quadtree structure.

According to an embodiment, the image decoding apparatus 200 may previously determine the minimum size allowed for the reference data units included in the current picture. Accordingly, the image decoding apparatus 200 may determine various reference data units having sizes equal to or greater than the minimum size, and may determine one or more coding units by using the block shape information and the split shape information with reference to the determined reference data unit.

Referring to FIG. 22, the image decoding apparatus 200 may use a square reference coding unit 2200 or a non-square reference coding unit 2202. According to an embodiment, the shape and size of reference coding units may be determined based on various data units capable of including one or more reference coding units (e.g., sequences, pictures, slices, slice segments, largest coding units, or the like).

According to an embodiment, the receiver 210 of the image decoding apparatus 200 may obtain, from a bitstream, at least one of reference coding unit shape information and reference coding unit size information with respect to each of the various data units. An operation of splitting the square reference coding unit 2200 into one or more coding units has been described above in relation to the operation of splitting the current coding unit 300 of FIG. 10, and an operation of splitting the non-square reference coding unit 2200 into one or more coding units has been described above in relation to the operation of splitting the current coding unit 1100 or 1150 of FIG. 11. Thus, detailed descriptions thereof will not be provided herein.

According to an embodiment, the image decoding apparatus 200 may use a PID for identifying the size and shape of reference coding units, to determine the size and shape of reference coding units according to some data units previously determined based on a predetermined condition. That is, the receiver 210 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 200 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 200 may determine at least one of the size and shape of reference coding units included in a data unit serving as a unit for obtaining the PID, by selecting the previously determined at least one of the size and shape of reference coding units based on the PID.

According to an embodiment, the image decoding apparatus 200 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 200 may determine the reference coding units by splitting the largest coding unit n times based on a quadtree structure, and may split the reference coding unit based on at least one of the block shape information and the split shape information according to various embodiments.

Figure 23:
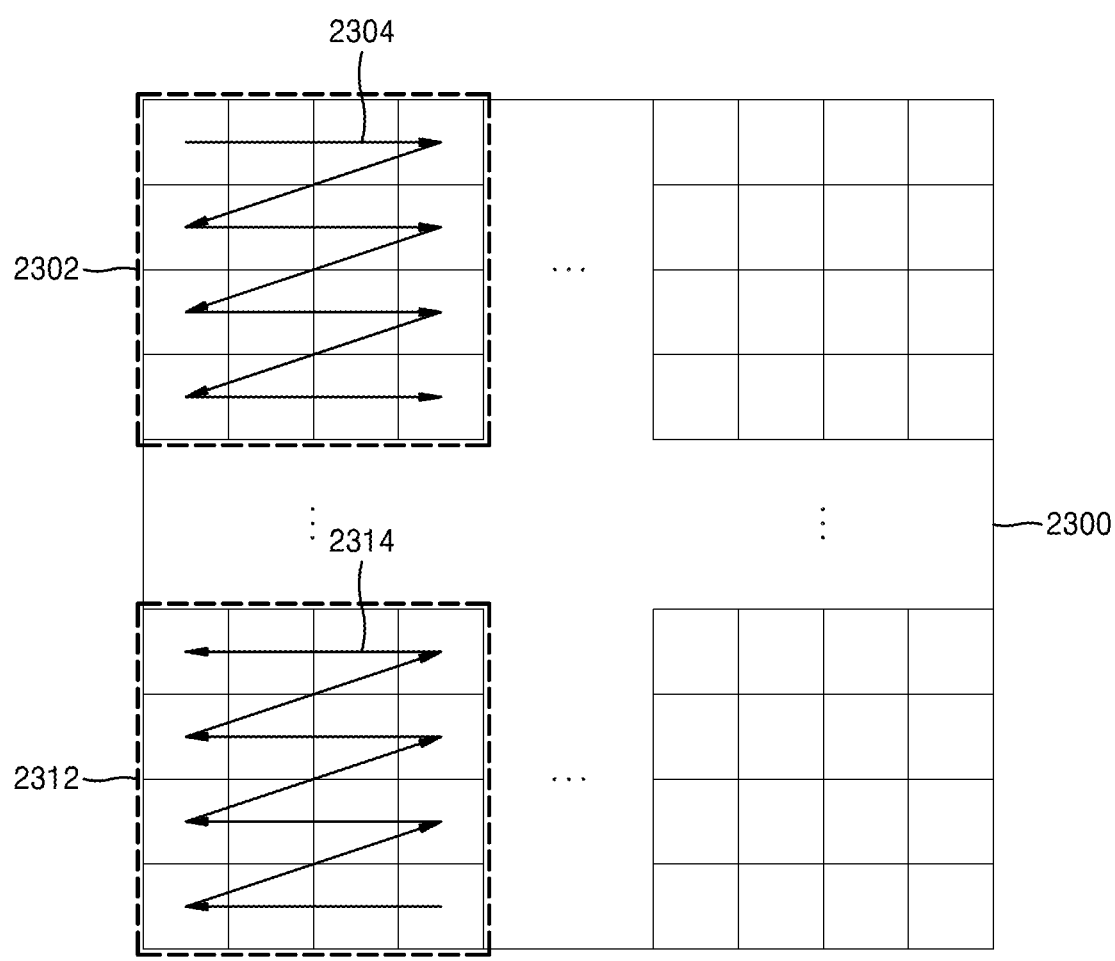
FIG. 23 illustrates a processing block serving as a unit for determining a determination order of reference coding units included in a picture, according to an embodiment.

FIG. 23 illustrates a processing block serving as a unit for determining a determination order of reference coding units included in a picture 2300, according to an embodiment.

According to an embodiment, the image decoding apparatus 200 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 200 may obtain processing block size information and may determine the size of one or more processing blocks included in the picture. The image decoding apparatus 200 may obtain the processing block size information from a bitstream and may determine the size of one or more processing blocks included in the picture. The size of processing blocks may be a predetermined size of data units, which is indicated by the processing block size information.

According to an embodiment, the receiver 210 of the image decoding apparatus 200 may obtain the processing block size information from the bitstream according to each specific data unit. For example, the processing block size information may be obtained from the bitstream in a data unit such as an image, sequence, picture, slice, or slice segment. That is, the receiver 210 may obtain the processing block size information from the bitstream according to each of the various data units, and the image decoding apparatus 200 may determine the size of one or more processing blocks, which are split from the picture, by using the obtained processing block size information. The size of the processing blocks may be integer times that of the reference coding units.

According to an embodiment, the image decoding apparatus 200 may determine the size of processing blocks 2302 and 2312 included in the picture 2300. For example, the image decoding apparatus 200 may determine the size of processing blocks based on the processing block size information obtained from the bitstream. Referring to FIG. 23, according to an embodiment, the image decoding apparatus 200 may determine a width of the processing blocks 2302 and 2312 to be four times the width of the reference coding units, and may determine a height of the processing blocks 2302 and 2312 to be four times the height of the reference coding units. The image decoding apparatus 200 may determine a determination order of one or more reference coding units in one or more processing blocks.

According to an embodiment, the image decoding apparatus 200 may determine the processing blocks 2302 and 2312, which are included in the picture 2300, based on the size of processing blocks, and may determine a determination order of one or more reference coding units in the processing blocks 2302 and 2312. According to an embodiment, determination of reference coding units may include determination of the size of the reference coding units.

According to an embodiment, the image decoding apparatus 200 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 200 may obtain, from the bitstream, the determination order information of reference coding units according to each specific data unit. For example, the receiver 210 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 200 may determine one or more reference coding units based on the determined determination order.

According to an embodiment, the receiver 210 may obtain the determination order information of reference coding units from the bitstream as information related to the processing blocks 2302 and 2312, and the image decoding apparatus 200 may determine a determination order of one or more reference coding units included in the processing blocks 2302 and 2312 and determine one or more reference coding units, which are included in the picture 2300, based on the determination order. Referring to FIG. 23, the image decoding apparatus 200 may determine determination orders 2304 and 2314 of one or more reference coding units in the processing blocks 2302 and 2312, respectively. For example, when the determination order information of reference coding units is obtained with respect to each processing block, different types of the determination order information of reference coding units may be obtained for the processing blocks 2302 and 2312. When the determination order 2304 of reference coding units in the processing block 2302 is a raster scan order, reference coding units included in the processing block 2302 may be determined according to a raster scan order. On the contrary, when the determination order 2314 of reference coding units in the other processing block 2312 is a backward raster scan order, reference coding units included in the processing block 2312 may be determined according to the backward raster scan order.

According to an embodiment, the image decoding apparatus 200 may decode the determined one or more reference coding units. The image decoding apparatus 200 may decode an image, based on the reference coding units determined as described above. A method of decoding the reference coding units may include various image decoding methods.

According to an embodiment, the image decoding apparatus 200 may obtain block shape information indicating the shape of a current coding unit or split shape information indicating a splitting method of the current coding unit, from the bitstream, and may use the obtained information. The block shape information or the split shape information may be included in the bitstream related to various data units. For example, the image decoding apparatus 200 may use the block shape information or the split shape information included in a sequence parameter set, a picture parameter set, a video parameter set, a slice header, or a slice segment header. Furthermore, the image decoding apparatus 200 may obtain, from the bitstream, syntax corresponding to the block shape information or the split shape information according to each largest coding unit, each reference coding unit, or each processing block, and may use the obtained syntax.

While the present disclosure has been particularly shown and described with reference to embodiments thereof, it will be understood by one of ordinary skill in the art that various changes in form and details may be made therein without departing from the scope of the disclosure as defined by the following claims. The embodiments should be considered in a descriptive sense only and not for purposes of limitation. Therefore, the scope of the disclosure is defined not by the detailed description of the disclosure but by the following claims, and all differences within the scope will be construed as being included in the present disclosure.

Meanwhile, the afore-described embodiments of the present disclosure can be written as computer programs and can be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

The invention claimed is:

1. An image decoding method comprising:
   obtaining, from a bitstream, image data which includes encoded data regarding a first region of a projection image corresponding to a non-clipping region of a 360-degree image;
   decoding the first region of the projection image corresponding to the non-clipping region of the 360-degree image from the encoded data regarding the first region corresponding to the non-clipping region of the 360-degree image included in the image data;
   obtaining, from the bitstream, flag information indicating whether the 360-degree image includes a clipping region;
   determining whether to obtain information about a position of the clipping region, according to the flag information indicating whether the 360-degree image includes the clipping region;
   obtaining the information about the position of the clipping region of the 360-degree image from the bitstream when it is determined to obtain the information about the position of the clipping region;
   determining a second region of the projection image corresponding to the clipping region of the 360-degree image, by using at least part of the first region which is adjacent to the second region, based on the information about the position of the clipping region obtained from the bitstream; and
   converting the projection image including at least one of the first region and the second region into the 360-degree image,
   wherein the second region of the projection image is not determined and the first region of the projection image is all of the 360-degree image when it is not determined to obtain the information about the clipping region.

2. The image decoding method of claim 1, wherein the clipping region includes at least one of a first spherical segment of one base generated when an upper sphere of the 360-degree image is cut along a horizontal plane and a second spherical segment of one base generated when a lower sphere of the 360-degree image is cut along a horizontal plane.

3. The image decoding method of claim 2, wherein the information about the position of the clipping region includes at least one of information about a first angle formed between a top point on the 360-degree image and a point on a circumference of a base side of the first spherical segment of one base with respect to an inside center point of the 360-degree image, and information about a second angle formed between the top point and a point on a circumference of a base side of the second spherical segment of one base with respect to the inside center point.

4. The image decoding method of claim 1, wherein
the information about the position of the clipping region is stored in at least one of a video parameter set and a supplemental enhancement information (SEI) message in the bitstream.

5. The image decoding method of claim 1, wherein
the projection image is an image obtained by projecting the 360-degree image using any one of equirectangular projection, icosahedral projection, cubemap projection, octahedron projection, and rotated sphere projection.

6. An image decoding apparatus comprising:
at least one processor configured to:
  obtain, from a bitstream, image data which includes encoded data regarding a first region of a projection image corresponding to a non-clipping region of a 360-degree image,
  decode the first region of the projection image corresponding to the non-clipping region of the 360-degree image from the encoded data regarding the first region corresponding to the non-clipping region of the 360-degree image included in the image data, to obtain, from the bitstream, flag information indicating whether the 360-degree image includes a clipping region,
  determine whether to obtain information about a position of the clipping region, according to the flag information indicating whether the 360-degree image includes the clipping region,
  obtain the information about the position of the clipping region of the 360-degree image from the bitstream when it is determined to obtain the information about the position of the clipping region,
  determine a second region of the projection image corresponding to the clipping region of the 360-degree image, by using at least part of the first region which is adjacent to the second region, based on the information about the clipping region obtained from the bitstream, and
  convert the projection image including at least one of the first region and the second region into the 360-degree image,
wherein the second region of the projection image is not determined and the first region of the projection image is all of the 360-degree image when it is not determined to obtain the information about the clipping region.

7. The image decoding apparatus of claim 6, wherein
the clipping region includes at least one of a first spherical segment of one base generated when an upper sphere of the 360-degree image is cut along a horizontal plane and a second spherical segment of one base generated when a lower sphere of the 360-degree image is cut along a horizontal plane.

8. An image encoding method comprising:
determining whether a 360-degree image includes a clipping region;
based on determining that the 360-degree image includes the clipping region:
converting the 360-degree image into a projection image; and
encoding a first region of the projection image corresponding to a non-clipping region of the 360-degree image; and
encoding flag information indicating whether the 360-degree image includes the clipping region based on the determining of whether the 360-degree image includes the clipping region;
generating a bitstream including image data for the encoded first region of the projection image, the flag information, and information about a position of the clipping region of the 360-degree image,
wherein a second region of the projection image corresponding to the clipping region of the 360-degree image is based on at least part of the first region which is adjacent to the second region, and
wherein the second region of the projection image is not determined and the first region of the projection image is all of the 360-degree image when it is not determined that the 360-degree image includes the clipping region.

9. The image encoding method of claim 8, wherein
the clipping region includes at least one of a first spherical segment of one base generated when an upper sphere of the 360-degree image is cut along a horizontal plane and a second spherical segment of one base generated when a lower sphere of the 360-degree image is cut along a horizontal plane.

10. The image encoding method of claim 8, wherein
the information about the position of the clipping region includes at least one of information about a first angle formed between a top point on the 360-degree image and a point on a circumference of a base side of a first spherical segment of one base with respect to an inside center point of the 360-degree image, and information about a second angle formed between the top point and a point on a circumference of a base side of a second spherical segment of one base with respect to the inside center point.

11. The image encoding method of claim 8, wherein
the information about the position of the clipping region is stored in at least one of a video parameter set and a supplemental enhancement information (SEI) message in the bitstream.

12. The image encoding method of claim 8, wherein
the projection image is an image obtained by projecting the 360-degree image using any one of equirectangular projection, icosahedral projection, cubemap projection, octahedron projection, and rotated sphere projection.

* * * * *